US009358703B2

(12) United States Patent
Matsen et al.

(10) Patent No.: US 9,358,703 B2
(45) Date of Patent: Jun. 7, 2016

(54) THERMOPLASTIC SANDWICH STRUCTURES

(71) Applicant: The Boeing Company, Chicago, IL (US)

(72) Inventors: Marc Rollo Matsen, Seattle, WA (US); Jeffery Lee Marcoe, Bellevue, WA (US); Aaron William Bartel, Mountlake Terrace, WA (US); John B. Moser, Bonney Lake, WA (US); Brett I. Lyons, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 139 days.

(21) Appl. No.: 13/937,269

(22) Filed: Jul. 9, 2013

(65) Prior Publication Data

US 2015/0013883 A1    Jan. 15, 2015

(51) Int. Cl.
| | | |
|---|---|---|
| *B29C 70/40* | (2006.01) | |
| *B29C 35/08* | (2006.01) | |
| *B29C 70/44* | (2006.01) | |
| *B29D 99/00* | (2010.01) | |
| *B29D 24/00* | (2006.01) | |
| *B29K 101/12* | (2006.01) | |
| *B29L 31/30* | (2006.01) | |

(52) U.S. Cl.
CPC ........... *B29C 35/0805* (2013.01); *B29C 70/446* (2013.01); *B29D 99/0014* (2013.01); *B29C 2035/0811* (2013.01); *B29D 24/004* (2013.01); *B29K 2101/12* (2013.01); *B29L 2031/3085* (2013.01)

(58) Field of Classification Search
CPC .... B29C 70/04; B29C 70/021; B29C 70/446; B29C 2035/0805; B29C 33/06; B29C 33/52; B29C 33/76; B29D 24/002; B29D 24/004; B29D 99/0014
See application file for complete search history.

(56) References Cited

U.S. PATENT DOCUMENTS

| | | | |
|---|---|---|---|
| 2,940,126 A | | 6/1960 | Sheridan |
| 4,056,596 A | | 11/1977 | Pahl |
| 4,946,526 A | * | 8/1990 | Petty-Galis et al. .......... 156/155 |
| 5,019,057 A | | 5/1991 | Truckai |
| 5,587,098 A | * | 12/1996 | Matsen et al. ................ 219/615 |
| 5,591,370 A | | 1/1997 | Matsen et al. |

(Continued)

FOREIGN PATENT DOCUMENTS

| | | |
|---|---|---|
| EP | 0400599 A2 | 12/1990 |
| EP | 2508329 A1 | 10/2012 |

(Continued)

OTHER PUBLICATIONS

Matsen et al., "Thermoplastic Structures," U.S. Appl. No. 13/937,253, filed Jul. 9, 2013, 50 pages.

(Continued)

*Primary Examiner* — Daniel McNally
(74) *Attorney, Agent, or Firm* — Yee & Associates, P.C.

(57) ABSTRACT

An apparatus and method are presented. An apparatus comprises a composite structure, a plurality of cavities extending into the composite structure, and a plurality of mandrels located within the plurality of cavities. The composite structure comprises a thermoplastic material that is consolidated. The plurality of mandrels comprises a first material that is configured to generate heat in response to a magnetic field.

21 Claims, 12 Drawing Sheets

(56) References Cited

U.S. PATENT DOCUMENTS

| | | | |
|---|---|---|---|
| 5,624,594 | A | 4/1997 | Matsen et al. |
| 5,645,744 | A | 7/1997 | Matsen et al. |
| 5,683,608 | A | 11/1997 | Matsen et al. |
| 5,710,414 | A | 1/1998 | Matsen et al. |
| 5,728,309 | A | 3/1998 | Matsen et al. |
| 5,772,681 | A | 6/1998 | Leoni et al. |
| 6,039,832 | A | 3/2000 | McCarville |
| 6,156,254 | A | 12/2000 | Andrews et al. |
| 6,180,932 | B1 * | 1/2001 | Matsen ............... B23K 1/002 219/615 |
| 6,528,771 | B1 | 3/2003 | Matsen et al. |
| 6,747,253 | B1 | 6/2004 | Firth et al. |
| 2002/0011509 | A1 | 1/2002 | Nelson et al. |
| 2003/0102070 | A1 | 6/2003 | Black et al. |
| 2004/0082965 | A1 | 4/2004 | Beckham |
| 2004/0104512 | A1 * | 6/2004 | Eidenschink ............... 264/295 |
| 2005/0035115 | A1 | 2/2005 | Anderson et al. |
| 2005/0258575 | A1 | 11/2005 | Kruse et al. |
| 2006/0289112 | A1 * | 12/2006 | Holman et al. ............ 156/272.2 |
| 2008/0302486 | A1 * | 12/2008 | Jones et al. ................ 156/475 |
| 2010/0170613 | A1 * | 7/2010 | Kendall et al. ............... 156/60 |
| 2010/0269326 | A1 | 10/2010 | Allehaux et al. |
| 2012/0228467 | A1 | 9/2012 | Wallen et al. |
| 2013/0075529 | A1 | 3/2013 | Marcoe |
| 2013/0082047 | A1 | 4/2013 | Matsen et al. |

FOREIGN PATENT DOCUMENTS

| | | |
|---|---|---|
| JP | H026107 A | 1/1990 |
| JP | 2011098514 A | 5/2011 |

OTHER PUBLICATIONS

Matsen et al., "Thermoplastic and Titanium Sandwich Structures," U.S. Appl. No. 13/937,285, filed Jul. 9, 2013, 50 pages.

International Search Report and Written Opinion, dated Oct. 16, 2014, regarding Application No. PCT/US2014/042467, 11 pages.

International Search Report and Written Opinion, dated Jan. 30, 2015, regarding Application No. PCT/US2014/045712, 18 pages.

Office Action, dated Apr. 15, 2015, regarding U.S. Appl. No. 13/937,253, 23 pages.

Matsen et al., "Induction Heating Using Induction Coils in Series-Parallel Circuits," U.S. Appl. No. 13/248,134, filed Sep. 29, 2011, 25 pages.

Matsen et al., "Metallic Bladders," U.S. Appl. No. 14/324,750, filed Jul. 7, 2014, 107 pages.

International Search Report and Written Opinion, dated Sep. 2, 2014, regarding Application No. PCT/US2014/042495, 7 pages.

Office Action, dated Sep. 23, 2015, regarding U.S. Appl. No. 13/937,285, 29 pages.

Final Office Action, dated Oct. 9, 2015, regarding U.S. Appl. No. 13/937,253, 21 pages.

Final Office Action, dated Feb. 11, 2016, regarding U.S. Appl. No. 13/937,285, 30 pages.

Office Action, dated Mar. 31, 2016, regarding U.S. Appl. No. 14/324,750, 36 pages.

* cited by examiner

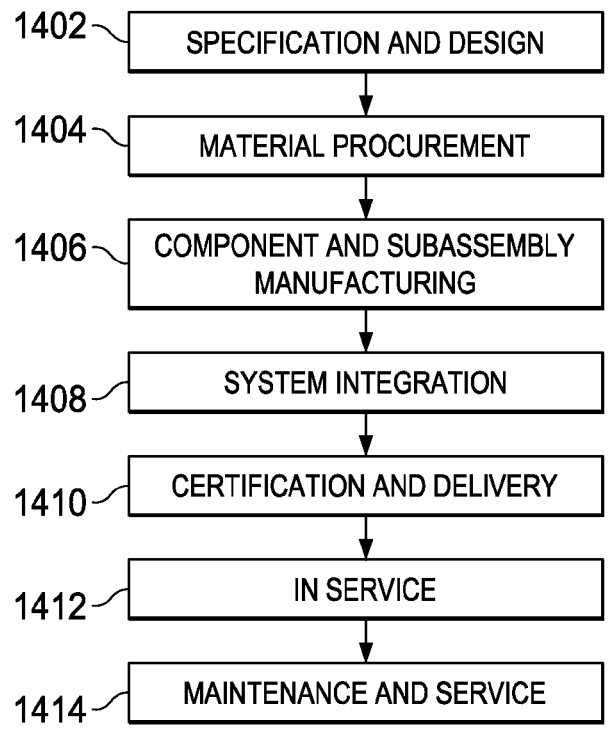
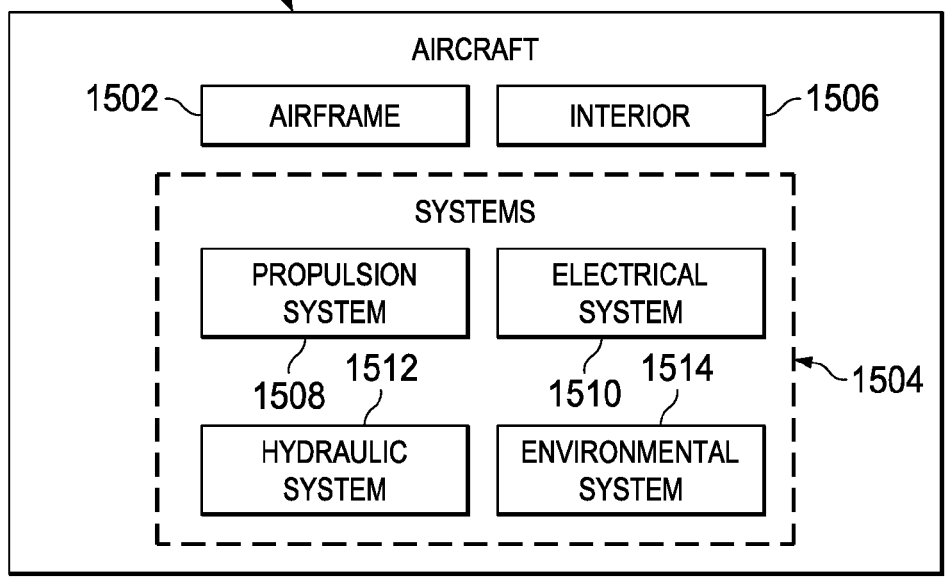

THERMOPLASTIC SANDWICH STRUCTURES

CROSS-REFERENCE TO RELATED APPLICATIONS

This application is related to the following patent applications: entitled "Thermoplastic and Titanium Sandwich Structures," Ser. No. 13/937,285, and "Thermoplastic Structures," Ser. No. 13/937,253, filed of even date herewith, each assigned to the same assignee, and each incorporated herein by reference.

BACKGROUND INFORMATION

1. Field

The present disclosure relates generally to the formation of composite structures. More particularly, the present disclosure relates to composite sandwich structures. Yet more particularly, the present disclosure relates to a method and apparatus for forming a sandwich structure comprising a thermoplastic material.

2. Background

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

Composite structures that include a core sandwiched between face sheets are used for many purposes. This arrangement forms a sandwich structure. Often the core includes cells or cavities. These cells or cavities are employed to reduce the weight of the composite structure as compared to a similar structure made from solid materials. Solid materials are materials without cells. The reduced weight of these composite structures has led the aircraft industry to use such composite structures to reduce the weight of aircraft components.

The time to create a sandwich structure from thermoset materials may be undesirable. For example, thermoset materials may be laid up by hand or by machine to form the shape of the sandwich structure. The speed of laying down composite material may be limited. Further, curing a thermoset material may require several hours. In addition to holding the thermoset material at a curing temperature for several hours, conventional autoclaves using resistive heating to cure thermoset materials may further require several hours for heating up and cooling down.

Consolidating a thermoplastic material may take less time than curing thermoset material. However, the time for resistive heating during consolidation of thermoplastic material may still be undesirable.

Currently, thermoplastic sandwich structures may be produced using fasteners. The use of fasteners increases the weight of the thermoplastic sandwich structures. The use of fasteners may also increase the time to create thermoplastic sandwich structures.

Accordingly there is a need for a method and assembly for producing a thermoplastic sandwich structure without the use of fasteners. There is also a need for a method of consolidating thermoplastic sandwich structures. Further, there is a need to consolidate the thermoplastic sandwich structures faster than using resistive heating to reduce at least one of cost of producing thermoplastic sandwich structures and the amount of time to produce thermoplastic sandwich structures.

Therefore, it would be desirable to have a method and apparatus that take into account at least some of the issues discussed above, as well as other possible issues.

SUMMARY

An apparatus is presented. The apparatus comprises a composite structure, a plurality of cavities extending into the composite structure, and a plurality of mandrels located within the plurality of cavities. The composite structure comprises a thermoplastic material that is consolidated. The plurality of mandrels comprises a first material that is configured to generate heat in response to a magnetic field.

An apparatus is presented. The apparatus comprises a composite structure and a plurality of mandrels. The composite structure comprises a thermoplastic material that is consolidated. The thermoplastic material comprises a thermoplastic core layer, a first thermoplastic layer, and a second thermoplastic layer. The thermoplastic core layer comprises a plurality of cavities extending into the composite structure. The first thermoplastic layer is on a first side of the thermoplastic core layer. The first side of the thermoplastic core layer comprises an exterior surface of the thermoplastic core layer. The second thermoplastic layer is on a second side of the thermoplastic core layer. The second side of the thermoplastic core layer comprises an interior surface of the thermoplastic core layer. The plurality of mandrels is located within the plurality of cavities. The plurality of mandrels comprises a first material that is configured to generate heat in response to a magnetic field and a second material that is soluble. The first material is formed into a plurality of metallic tubes within the first material.

A method of forming a consolidated structure is presented. A thermoplastic material is laid down to form a preform structure having a plurality of cavities extending into the preform structure. A plurality of mandrels is within the plurality of cavities. The preform structure is positioned within a tool. The tool has a number of die liners configured to generate heat in response to a magnetic field.

A method of forming a consolidated structure is presented. A braided thermoplastic material is laid down onto a metallic bladder to form a first thermoplastic layer. A braided thermoplastic material is laid down over a plurality of mandrels to form a plurality of core parts. The plurality of mandrels comprises a first material that is configured to generate heat in response to a magnetic field and a second material that is soluble. The plurality of core parts is placed over the first thermoplastic layer. A braided thermoplastic material is laid down over the plurality of core parts to form a preform structure. The preform structure is positioned within a tool. The tool has a number of die liners configured to generate heat in response to a magnetic field. The structure is consolidated to form the consolidated structure. Consolidating comprises applying a magnetic field to the number of die liners to heat the structure to a consolidation temperature, pressurizing the metallic bladder such that the metallic bladder imparts a compressive force, and cooling the structure in the tool. The consolidated structure is removed from the tool. The second material is dissolved within the consolidated structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of an aircraft manufacturing and service method in the form of a block diagram in accordance with an illustrative embodiment; and FIG. 15 is an illustration of an aircraft in the form of a block diagram in which an illustrative embodiment may be implemented.

DETAILED DESCRIPTION

Figure 1:
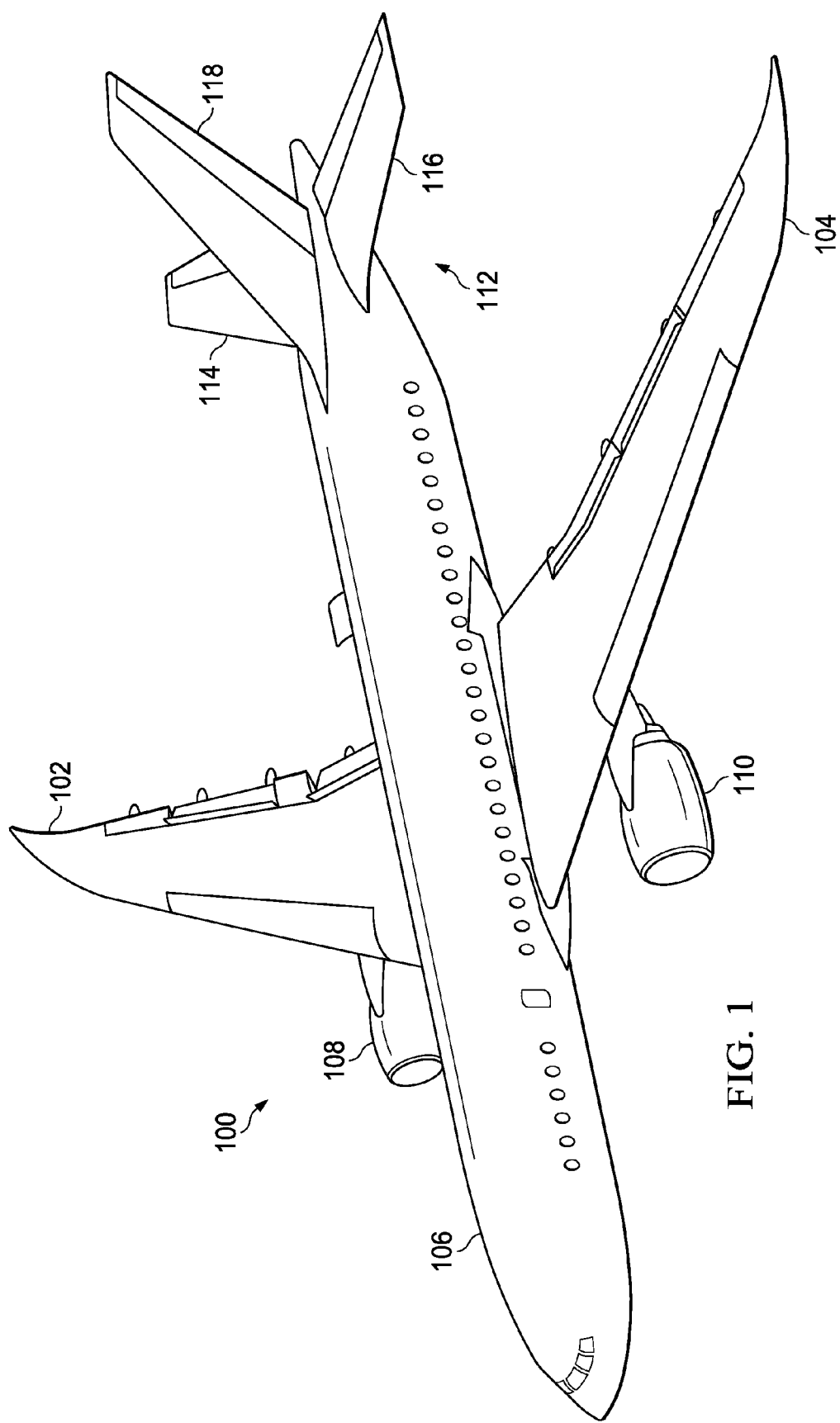
FIG. 1 is an illustration of an aircraft in accordance with an illustrative embodiment may be implemented.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

The different illustrative embodiments recognize and take into account a number of different considerations. For example, the illustrative embodiments recognize that the use of sandwich panels may allow for elimination of stringers, spars, frames, or other support structures in aircraft design.

The illustrative examples also recognize and take into account currently implemented composite sandwich structures may be created using thermoset materials. A composite sandwich structure comprises a structure having a plurality of layers of material. In a composite sandwich structure, one or more of the plurality of layers of material may be composed of or partially composed of composite materials. A composite sandwich structure may have a plurality of cavities extending into the structure. The illustrative embodiments recognize and take into account that the time required to create a sandwich structure from thermoset materials may be undesirable.

For example, thermoset materials may be laid up by hand or by machine to form the shape of the sandwich structure. The illustrative embodiments recognize and take into account that the speed of laying down composite material may be limited.

Further, the illustrative embodiments recognize and take into account that curing a thermoset material may require several hours. In addition to holding the thermoset material at a curing temperature for several hours, conventional autoclaves using resistive heating to cure thermoset materials may further require several hours for heating up and cooling down.

The different illustrative embodiments recognize and take into account that consolidating a thermoplastic material may take significantly less time than curing a thermoset material. Further, the different illustrative embodiments recognize and take into account that using inductive heating may reduce the time required to consolidate a thermoplastic material or cure a thermoset material. Yet further, the different illustrative embodiments recognize and take into account that using inductive heating may reduce the energy consumed to consolidate a thermoplastic material or cure a thermoset material.

The different illustrative embodiments recognize and take into account that reducing the time to form a part may increase the number of parts produced on a tool. Further, the different illustrative embodiments recognize and take into account that reducing the energy consumed to form a part may reduce the cost of the part.

The different illustrative embodiments recognize and take into account that currently, thermoplastic sandwich structures may be produced using fasteners. The different illustrative embodiments recognize and take into account that producing a thermoplastic sandwich structure without fasteners may reduce the time required to produce a thermoplastic sandwich structure. The different illustrative embodiments recognize and take into account that producing a thermoplastic sandwich structure without fasteners may reduce the weight of a resulting thermoplastic sandwich structure.

The different illustrative embodiments also recognize and take into account that braided composites may provide improved properties over stacked layers of composite tape or tows. For example, the illustrative embodiments recognize and take into account that braided composites may provide improved out of plane loading. Braided composites may comprise fibers which cross over each other, improving the out of plane loading over stacked composite layers. As used herein, "out of plane loads" refer to loads which are not in the plane of the object. For example, loads perpendicular to the surface of a braided composite are out of plane loads. Improved out of plane loading may result in improved damage tolerance. As used herein, improved damage tolerance means improved resistance to damage resulting from impact or other sources.

The different illustrative embodiments also recognize and take into account that using braided composites may reduce composite manufacturing time. For example, the different illustrative embodiments recognize and take into account that braiding machinery may utilize a larger number of spools of composite material at once than conventional composite placement machinery. Accordingly, the different illustrative embodiments recognize that using braiding machinery may reduce manufacturing time.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which thermoplastic sandwich structures may be implemented in accordance with an illustrative embodiment. In one illustrative embodiment, a skin panel of wing 104 may comprise a thermoplastic sandwich structure. In another illustrative embodiment, portions of body 106 may comprise a thermoplastic sandwich structure.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
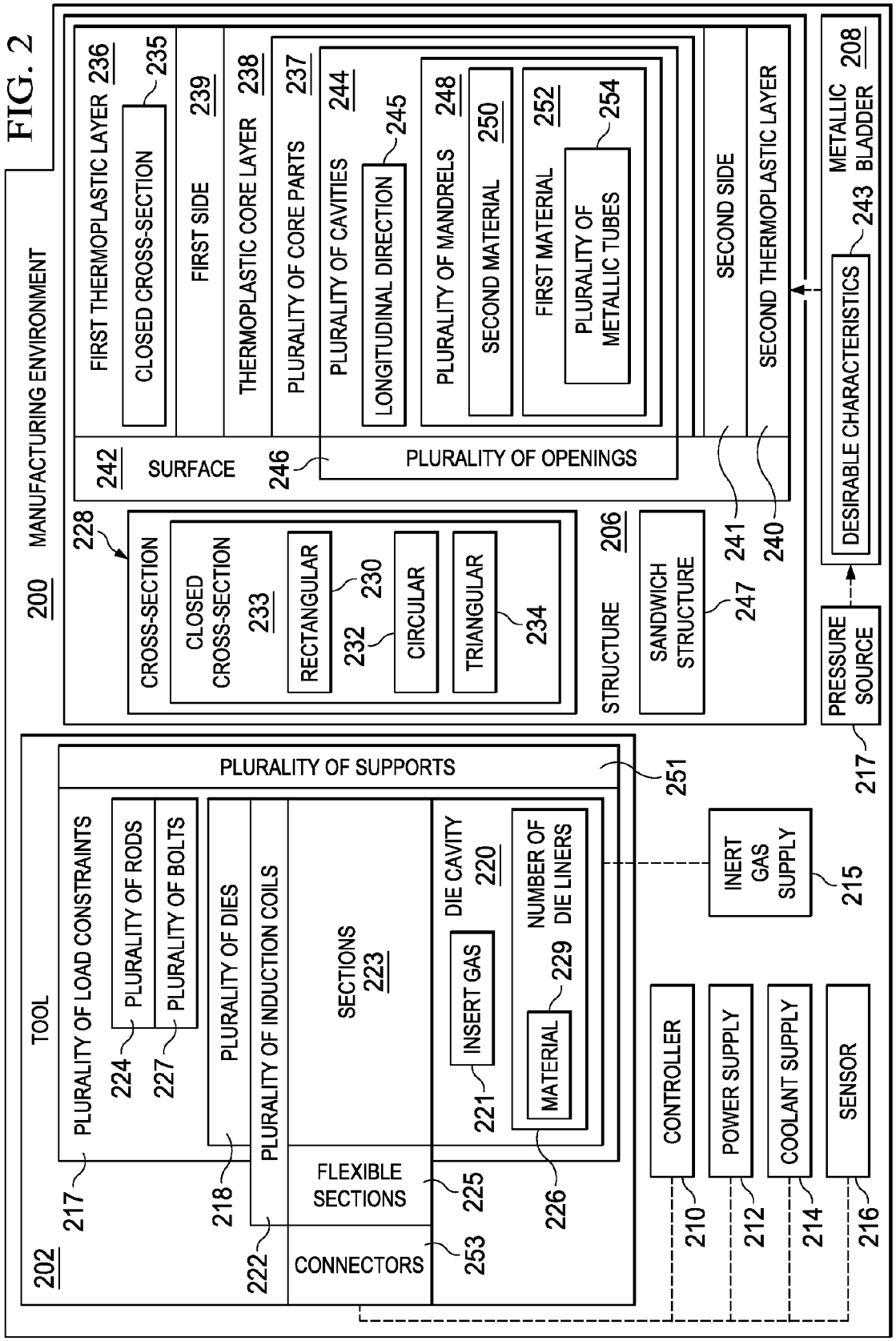
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 in FIG. 2 is depicted in a block form to illustrate different components for one or more illustrative embodiments. In this depicted example, manufacturing environment 200 includes tool 202, structure 206, metallic bladder 208, controller 210, power supply 212, coolant supply 214, and sensor 216.

Tool 202 is configured to consolidate structure 206. As used herein, consolidation comprises applying elevated temperature, elevated pressure, or elevated temperature and pressure to a thermoplastic material such that the resin in thermoplastic material flows. As the resin in the thermoplastic material flows, the reinforcing fibers may stay in substantially the same orientation. As the resin flows it may mingle with the resin of nearby thermoplastic materials at the boundaries of the nearby thermoplastic materials. The resin solidifies upon cooling. Consolidation may result in composite materials with a higher quality. In composite materials, higher quality may be a higher fiber volume relative to the entire volume of the composite material. Consolidation may result in composite materials with a lower void content. Tool 202 comprises plurality of load constraints 217 supported by plurality of supports 251. Tool also comprises plurality of dies 218 located within plurality of load constraints 217. Die cavity 220 may be a space created by plurality of dies 218. Die cavity 220 may be configured to contain structure 206 during a consolidation process.

Plurality of dies 218 may be formed of a material which is not susceptible to inductive heating. In some illustrative examples, plurality of dies 218 may be formed from a ceramic, a composite, a phenolic, or some other desirable material. In one illustrative example, the material for plurality of dies 218 may be selected based on a coefficient of thermal expansion, thermal shock resistance, and compression strength. In this illustrative example, the material may be selected to have a low coefficient of thermal expansion, desirable thermal shock resistance, and relatively high compression strength. In one illustrative example, plurality of dies 218 may be a castable fused silica ceramic.

As depicted, plurality of dies 218 contain plurality of induction coils 222 and plurality of rods 224. Plurality of induction coils 222 have sections 223 and flexible sections 225. Sections 223 of plurality of induction coils 222 may be embedded in plurality of dies 218. In some illustrative examples, sections 223 may extend along the length of each die of plurality of dies 218. Flexible sections 225 of plurality of induction coils 222 may join sections 223 of different dies in plurality of dies 218. In one illustrative example, flexible sections 225 may have adequate flexibility to move as plurality of dies 218 move. In one illustrative example, flexible sections 225 may have adequate flexibility to move to connect sections 223. Plurality of induction coils 222 may be connected to controller 210, power supply 212, coolant supply 214, and sensor 216 through connectors 253 attached to flexible sections 225.

Controller 210 may be configured to control the input power fed to plurality of induction coils 222 by power supply 212. By controlling the input power, controller 210 may control the magnetic field produced by induction coils 222. By controlling the magnetic field produced by induction coils 222, controller 210 may control the operating temperature of tool 202.

Controller 210 may be implemented in software, hardware, firmware or a combination thereof. When software is used, the operations performed by controller 210 may be implemented in program code configured to run on a processor unit. When firmware is used, the operations performed by controller 210 may be implemented in program code and data and stored in persistent memory to run on a processor unit. When hardware is employed, the hardware may include circuits that operate to perform the operations in controller 210.

Coolant supply 214 may be configured to supply coolant to plurality of induction coils 222. Coolant flowing through plurality of induction coils 222 may function as a heat exchanger to transfer heat out of tool 202. Sensor 216 may be configured to measure a temperature of a portion of tool 202 during operation.

Plurality of rods 224 may be embedded within plurality of dies 218. Plurality of rods 224 may provide reinforcement for plurality of dies 218. In one illustrative example, plurality of rods 224 is formed from fiberglass. Plurality of rods 224 may be held in place by a plurality of bolts 227. In some illustrative examples, plurality of rods 224 may extend longitudinally through a die in plurality of dies 218. In some illustrative examples, plurality of rods 224 may extend transversely through a die in plurality of dies 218. In some illustrative examples, plurality of rods 224 may extend both longitudinally and transversely through a die in plurality of dies 218.

Die cavity 220 is associated with inert gas supply 215. During consolidation of structure 206, inert gas 221 may be present in die cavity 220 from inert gas supply 215. In some illustrative examples, inert gas supply 215 may supply inert gas to pressurize metallic bladder 208.

Number of die liners 226 is positioned within die cavity 220. As depicted, number of die liners 226 comprises material 229. Material 229 may be a material configured to generate heat when exposed to a magnetic field. Material 229 may be selected from a metal, a metal alloy, a ceramic, a metalized film, or any other suitable material. In some illustrative examples, number of die liners 226 comprises a metallic alloy having ferromagnetic properties. In some illustrative examples, a ferromagnetic material for number of die liners 226 may be selected based on a desired consolidation temperature. For example, the material for number of die liners 226 may be selected based on a temperature at which a ferromagnetic material becomes non-magnetic. This temperature is also known as a Curie temperature. A ferromagnetic material may be selected for number of die liners 226 such that the Curie temperature for the ferromagnetic material corresponds to a desired consolidation temperature. In these illustrative examples, number of die liners 226 may also be referred to as a number of smart susceptors.

Number of die liners 226 may generate heat when exposed to a magnetic field generated by plurality of induction coils 222. Number of die liners 226 may be used to apply heat to structure 206 during a consolidation process.

Structure 206 has cross-section 228. Cross-section 228 is closed cross-section 233. As used herein, a closed cross-section is one for which a structure forms a closed path. Accordingly, structure 206 has closed cross-section 233 when cross-section 228 of structure 206 forms a closed path. Closed cross-section 233 may be rectangular 230, circular 232, or triangular 234.

Structure 206 comprises first thermoplastic layer 236, thermoplastic core layer 238, and second thermoplastic layer 240. Structure 206 may also be referred to as a composite structure. Prior to consolidation, structure 206 may be referred to as a preform structure. Following consolidation, structure 206 may be referred to as a consolidated structure.

Thermoplastic core layer 238 comprises plurality of core parts 237. Plurality of core parts 237 has plurality of cavities 244 extending into thermoplastic core layer 238. Plurality of cavities 244 extending into structure 206 are in communication with plurality of openings 246 in surface 242 of structure 206. Plurality of cavities 244 may extend through structure 206 in longitudinal direction 245. In some illustrative examples, plurality of cavities 244 may extend through structure 206 in a direction substantially parallel to first side 239 and second side 241 of thermoplastic core layer 238.

Thermoplastic core layer 238 contains plurality of mandrels 248 within plurality of cavities 244. In one illustrative example, structure 206 is sandwich structure 247 and plurality of mandrels 248 is internal to sandwich structure 247.

Plurality of mandrels 248 comprises second material 250 and first material 252. In the illustrative example, second material 250 is a soluble material. In one illustrative example, second material 250 may be soluble in water. In this illustrative example, second material 250 may be selected from at least one of a ceramic, graphite, or other suitable material which is soluble in water. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

First material 252 is a material configured to generate heat in response to a magnetic field. In some illustrative examples, first material 252 comprises a metallic alloy having ferromagnetic properties. In some illustrative examples, a ferromagnetic material for first material 252 may be selected based on at least one of a desired consolidation temperature and the Curie temperature of number of die liners 226. For example, the material for first material 252 may be selected based on a temperature at which number of die liners 226 becomes non-magnetic. A ferromagnetic material may be selected for first material 252 such that the first material 252 generates heat after number of die liners 226 becomes non-magnetic. In these illustrative examples, plurality of metallic tubes 254 may also be referred to as a plurality of smart susceptors. First material 252 may be selected from alloy 510, Invar, Kovar, Moly Permalloy, or any other suitable material that generates heat when exposed to a magnetic field. Alloy 510 may also be known as Phosphor Bronze. In some illustrative examples, plurality of metallic tubes 254 may be formed of Invar. First material 252 may be selected based on at least one of a desired consolidation temperature and the Curie temperature of the number of die liners. First material 252 may be Invar when the Curie temperature of Invar is desirable taking into account the desired consolidation temperature and the Curie temperature of the number of die liners. Invar may be selected as first material 252 based on other properties of Invar. Specifically, the coefficient of thermal expansion of Invar may be desirable for use in composite material processing. The coefficient of thermal expansion of Invar may be substantially similar to the coefficient of thermal expansion of composite material.

In some illustrative examples, first material 252 may be embedded within second material 250 in plurality of mandrels 248. In one illustrative example, first material 252 may take the form of a plurality of metallic tubes 254 within second material 250.

First thermoplastic layer 236 has closed cross-section 235. In some illustrative examples, closed cross-section 235 may have substantially the same shape as closed cross-section 233 of structure 206.

First thermoplastic layer 236, thermoplastic core layer 238, and second thermoplastic layer 240 may be co-consolidated. As used herein, a material is consolidated when the material is exposed to at least one of heat and pressure so that the material flows and solidifies. As used herein, materials may be co-consolidated when the materials are exposed together to at least one of heat and pressure so that the materials flow and solidify. Co-consolidating first thermoplastic layer 236 and thermoplastic core layer 238 may create an interface where resin of first thermoplastic layer 236 and resin of thermoplastic core layer 238 may flow together. Likewise, co-consolidating second thermoplastic layer 240 and thermoplastic core layer 238 may create an interface where resin of second thermoplastic layer 240 and resin of thermoplastic core layer 238 may flow together.

In some illustrative examples, first thermoplastic layer 236 may be consolidated against first side 239 of thermoplastic core layer 238. In one illustrative example, first side 239 may comprise an exterior surface of thermoplastic core layer 238. In some illustrative examples, second thermoplastic layer 240 may be consolidated against second side 241 of thermoplastic core layer 238. In one illustrative example, second side 241 may comprise an interior surface of thermoplastic core layer 238.

Metallic bladder 208 may be associated with second thermoplastic layer 240. In some illustrative examples, metallic bladder 208 may be placed within second thermoplastic layer 240. In some illustrative examples, second thermoplastic layer 240 may be placed onto metallic bladder 208. In some illustrative examples, metallic bladder 208 may function as a mandrel. During consolidation, metallic bladder 208 may be pressurized such that metallic bladder 208 imparts a compressive force. In some illustrative examples, metallic bladder 208 may be pressurized using an inert gas.

When structure 206 is a braided thermoplastic material, slits of braided thermoplastic material may move relative to each other. This movement of braided thermoplastic material may occur when metallic bladder 208 expands under pressure. Movement of braided thermoplastic material may improve the quality of resulting structure 206.

Metallic bladder 208 may be formed from a material exhibiting desirable characteristics 243. Desirable characteristics 243 for metallic bladder 208 may include an ability to hold pressure, thermal stability, flexibility, conformity, and thermal expansion characteristics. For example, it may be desirable for the material of metallic bladder 208 to be thermally stable at consolidation temperatures for structure 206.

Additionally, it may be desirable for the material of metallic bladder 208 to be flexible to provide an even distribution of pressure. Further, it may be desirable for the material of metallic bladder 208 to be conformable to conform to ply drops or other topography of structure 206. Yet further, it may be desirable for the material of metallic bladder 208 to have thermal expansion characteristics to allow for removal of metallic bladder 208 following consolidation.

In some illustrative examples, number of metallic bladders 208 may be formed of materials having magnetic properties. In some of these illustrative examples, number of metallic bladders 208 may generate heat when exposed to a magnetic field. In some illustrative examples, number of metallic bladders 208 may be formed of a non-magnetic material.

In some illustrative examples, metallic bladder 208 may be formed of aluminum or an aluminum alloy. In some illustrative examples, metallic bladder 208 may be formed of magnesium or a magnesium alloy. In other illustrative examples, other metallic materials than aluminum or magnesium may provide desirable characteristics 243 such as an ability to hold pressure, thermal stability, flexibility, conformity, and thermal expansion characteristics.

Metallic bladder 208 is associated with pressure source 217. Pressure source 217 is configured to pressurize metallic bladder 208 during consolidation of structure 206 in tool 202.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of rods 224 may instead be formed of a material other than fiberglass. In this example, a plurality of reinforcing rods may be formed of a material which is preferably not electrically conductive. In another example, the plurality of reinforcing rods may be formed of an electrically conductive material and arranged such that they are not susceptible to induction heating.

As another example, instead of thermoplastic material of first thermoplastic layer 236, thermoplastic core layer 238, and second thermoplastic layer 240, structure 206 may comprise a thermoset material. Although tool 202 is described above as performing a consolidating process, in this illustrative example, tool 202 may be used to perform a curing process of the thermoset material. Curing a thermoset material may be performed at a lower temperature than consolidating a thermoplastic material. As a result, in these illustrative examples, number of metallic bladders 208 may comprise an elastomeric material rather than a metallic material.

As a further example, cross-section 228 may be an open cross-section or a substantially closed cross-section. For example, cross-section 228 may be a V-shape, I-shape, J-shape, Z-shape, T-shape, C-shape, U-shape, or other suitable shape.

Figure 3:
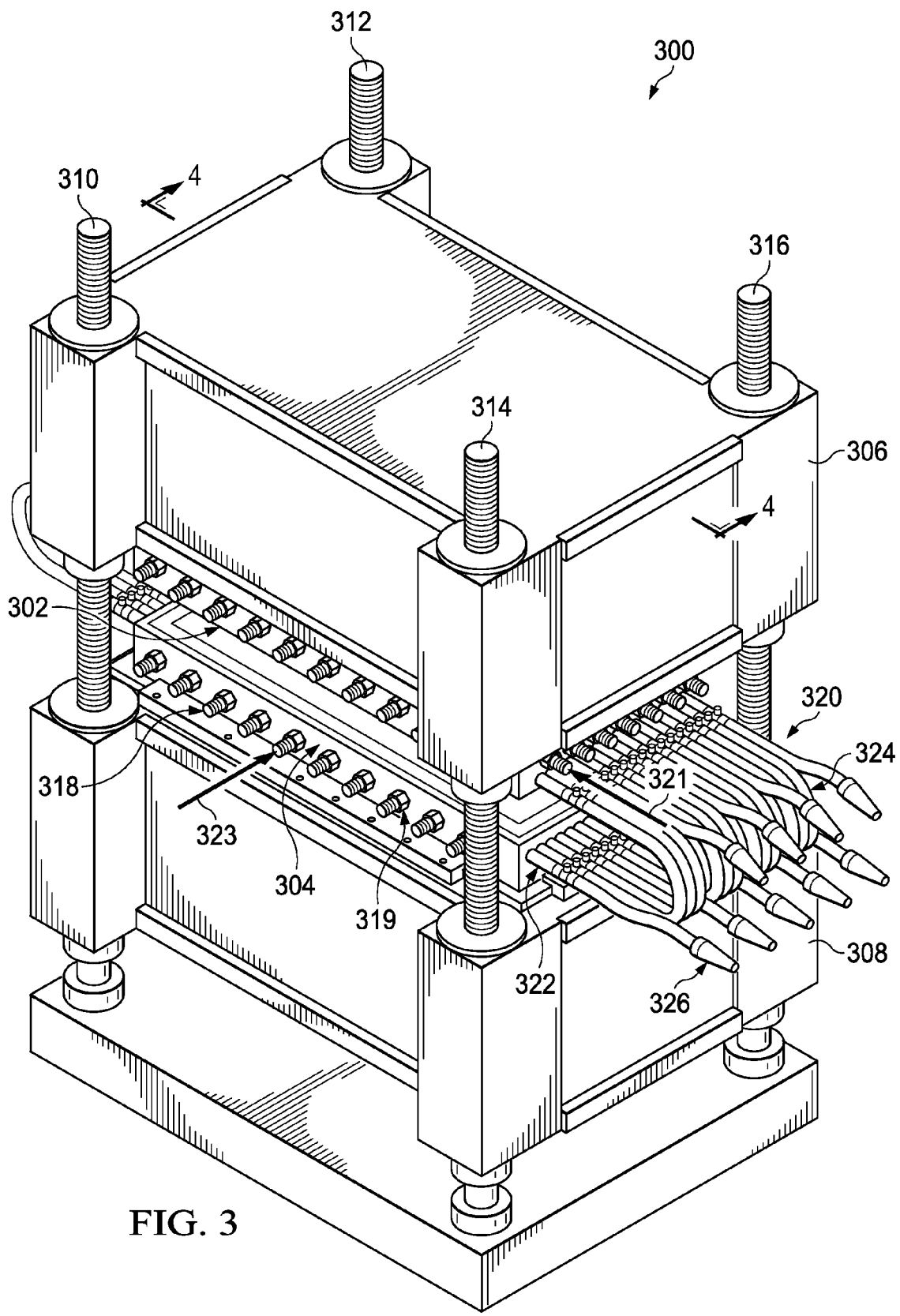
FIG. 3 is an illustration of a perspective view of a tool in accordance with an illustrative embodiment.

Turning now to FIG. 3, an illustration of a perspective view of a tool is depicted in accordance with an illustrative embodiment. In this depicted example, tool 300 is an example of a physical implementation for tool 202 and components in tool 202 in FIG. 2.

In this illustrative example, tool 300 includes first die 302 and second die 304. First die 302 and second die 304 may be a physical implementation of plurality of dies 218 of FIG. 2. As depicted, first die 302 is mounted within load constraint 306 and second die 304 is mounted within load constraint 308. Load constraint 306 and load constraint 308 may be a physical implementation of plurality of load constraints 217 of FIG. 2. First die 302 and second die 304 may be attached to load constraint 306 and load constraint 308, respectively, by any suitable fastening device such as bolting or clamping.

As depicted, load constraint 306 and load constraint 308 are mounted on column support 310, column support 312, column support 314, and column support 316. Column support 310, column support 312, column support 314, and column support 316 may be a physical implementation of plurality of supports 251 of FIG. 2. Load constraint 306 and load constraint 308 provide backing surfaces for first die 302 and second die 304. Load constraint 306 and load constraint 308 may prevent first die 302 and second die 304 from bending and cracking during manufacturing operations. Load constraint 306 and load constraint 308 may be formed from steel, aluminum, or any other desirable material. Material for load constraint 306 and load constraint 308 may be selected based on the loads present during forming or consolidation. Material for load constraint 306 and load constraint 308 may be selected to provide desirable characteristics such as desirable rigidity and desirable strength to prevent first die 302 and second die 304 from bending and/or cracking during manufacturing operations. In some illustrative examples, the material may be nonmagnetic to reduce any distortion to the magnetic field produced by plurality of induction coils 320. In some illustrative examples, load constraint 306 and load constraint 308 may not be present. In these illustrative examples, first die 302 and second die 304 may be strong enough to prevent bending or cracking of first die 302 and second die 304 without load constraint 306 and load constraint 308.

First die 302 and second die 304 are reinforced with plurality of rods 318 that are held with plurality of bolts 319. Plurality of rods 318 may be a physical implementation of plurality of rods 224 of FIG. 2. Plurality of bolts 319 may be a physical implementation of plurality of bolts 227 of FIG. 2. Plurality of rods 318 extends both longitudinally 321 and transversely 323 in a grid through first die 302 and second die 304.

Plurality of induction coils 320 are associated with first die 302 and second die 304. Plurality of induction coils 320 may be a physical implementation of plurality of induction coils 222 of FIG. 2. Plurality of induction coils 320 comprises sections 322 and flexible sections 324. As depicted, sections 322 extend along the length of first die 302 and second die 304. Sections 322 may be a physical implementation of sections 223 of FIG. 2. Sections 322 may be embedded in first die 302 and second die 304. Flexible sections 324 join sections 322 in first die 302 and second die 304. Flexible sections 324 may be a physical implementation of flexible sections 225 of FIG. 2. Connectors 326 located at the ends of plurality of induction coils 320 may connect plurality of induction coils 320 to a controller, power source, coolant supply, or other external utility. Connectors 326 may be a physical implementation of connectors 253 of FIG. 2.

The illustration of tool 300 in FIG. 3 is not meant to imply physical or architectural limitations to the manner in which an illustrative embodiment may be implemented. Other components in addition to or in place of the ones illustrated may be used. Some components may be unnecessary.

For example, plurality of rods 318 may extend in only one direction within first die 302 and second die 304. As another example, although only first die 302 and second die 304 are depicted, tool 300 may instead have three or more dies.

Figure 4:
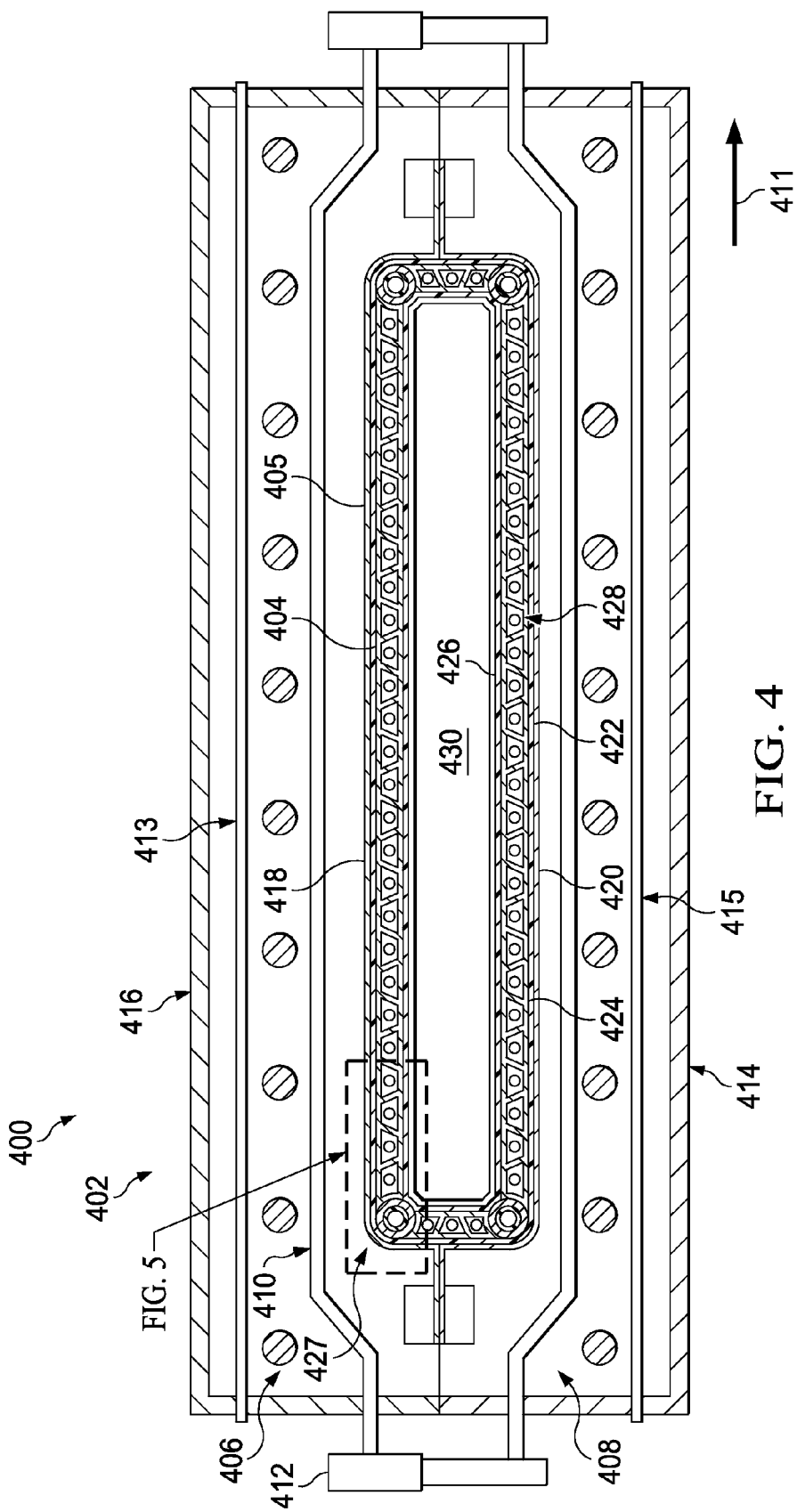
FIG. 4 is an illustration of a cross-sectional view of a structure within a tool in accordance with an illustrative embodiment.

Turning now to FIG. 4, an illustration of a cross-sectional view of a structure within a tool is depicted in accordance with an illustrative embodiment. View 400 may be a cross-sectional view of a structure within tool 300 of FIG. 3 from direction 323 and cut along 4-4. Tool 402 may be a physical implementation of tool 202 in FIG. 2. Structure 404 may be a physical implementation of structure 206 in FIG. 2.

As depicted, structure 404 is positioned within tool 402. Specifically, structure 404 is positioned between first die 406 and second die 408 within die cavity 405 of tool 402. Plurality of induction coils 410 runs longitudinally 411 through first die 406 and second die 408. Plurality of induction coils 410 are joined by flexible sections 412. Plurality of rods 413 runs through first die 406. Plurality of rods 415 runs through second die 408. First die 406 and second die 408 are held within load constraint 414 and load constraint 416.

Die liner 418 is associated with first die 406 within die cavity 405. Die liner 420 is associated with second die 408 in die cavity 405. Die liner 418 and die liner 420 contact structure 404 within die cavity 405.

Structure 404 comprises first thermoplastic layer 422, thermoplastic core layer 424, and second thermoplastic layer 426. First thermoplastic layer 422 may be a physical implementation of first thermoplastic layer 236 of FIG. 2. Thermoplastic core layer 424 may be a physical implementation of thermoplastic core layer 238 of FIG. 2. Second thermoplastic layer 426 may be a physical implementation of second thermoplastic layer 240 of FIG. 2.

Second thermoplastic layer 426 may be formed using a composite layup process. The composite layup process may be selected from one of braiding, tape layup, tow layup, or any other desirable composite layup process. In some illustrative examples, second thermoplastic layer 426 may be placed on metallic bladder 430 through a composite layup process. In one illustrative example, the composite layup process may lay composite material directly onto metallic bladder 430. In one illustrative example, braided composite material may be placed directly onto metallic bladder 430 to form second thermoplastic layer 426.

In some illustrative examples, second thermoplastic layer 426 may be placed on metallic bladder 430 as a preform. In this illustrative example, second thermoplastic layer 426 may be formed to a desired shape prior to being placed on metallic bladder 430. In some illustrative examples, second thermoplastic layer 426 may be consolidated or semi rigid as second thermoplastic layer 426 is placed on metallic bladder 430.

Thermoplastic core layer 424 is positioned adjacent to second thermoplastic layer 426. Thermoplastic core layer 424 has plurality of cavities 427. Plurality of cavities 427 contains plurality of mandrels 428. Plurality of cavities 427 extend into FIG. 4. In other words, plurality of cavities 427 extend longitudinally through structure 404.

Thermoplastic core layer 424 may be formed using a composite layup process. The composite layup process may be selected from one of braiding, tape layup, tow layup, or other desirable composite layup process. In some illustrative examples, thermoplastic core layer 424 may be formed by laying composite material onto plurality of mandrels 428. In one illustrative example, thermoplastic core layer 424 may be formed by laying down a braided thermoplastic material over plurality of mandrels 428. After laying composite material onto plurality of mandrels 428, plurality of mandrels 428 may be positioned relative to each other to form thermoplastic core layer 424. In one illustrative example, plurality of mandrels 428 may be positioned relative to each other on second thermoplastic layer 426.

First thermoplastic layer 422 may be formed of a number of layers of composite tape, composite tows, a braided composite, or any other suitable composite material. First thermoplastic layer 422 may be formed using a composite layup process. The composite layup process may be selected from one of braiding, tape layup, tow layup, or any other desirable composite layup process. In some illustrative examples, first thermoplastic layer 422 may be placed on thermoplastic core layer 424 through a composite layup process. In one illustrative example, the composite layup process may lay composite material directly onto thermoplastic core layer 424. In one illustrative example, braided composite material may be laid directly onto thermoplastic core layer 424 to form first thermoplastic layer 422.

In some illustrative examples, first thermoplastic layer 422 may be placed on thermoplastic core layer 424 as a preform. As used herein, a preform is a composite material formed to a desired shape prior to being placed onto a location. In this illustrative example, first thermoplastic layer 422 may be formed to a desired shape prior to being placed on thermoplastic core layer 424. In some illustrative examples, first thermoplastic layer 422 may be consolidated or semi rigid as first thermoplastic layer 422 is placed on thermoplastic core layer 424.

To consolidate structure 404, power may be supplied to plurality of induction coils 410 to produce a magnetic field. In response to the magnetic field, die liner 418 and die liner 420 may generate heat.

Metallic bladder 430 may be pressurized. Metallic bladder 430 is positioned within structure 404 such that metallic bladder 430 contacts second thermoplastic layer 426 within structure 404.

When pressurized, metallic bladder 430 may impart a compressive force to structure 404. Metallic bladder 430 may impart a compressive force to structure 404 by expanding under pressure to press structure 404 against die liner 418 and die liner 420. Die liner 418 and die liner 420 are associated with first die 406 and second die 408. First die 406 and second die 408 define an outer mold line for structure 404. When metallic bladder 430 is pressurized, first die 406 and second die 408 provide resistant pressure. In other words, first die 406 and second die 408 may provide a substantially rigid outer mold line for structure 404. Effectively metallic bladder 430 expands and presses structure 404 against first die 406 and second die 408.

When structure 404 is a braided thermoplastic material, slits of braided thermoplastic material may move relative to each other. This movement of braided thermoplastic material may occur when metallic bladder 430 expands under pressure. Movement of braided thermoplastic material may improve the quality of resulting structure 404.

Plurality of mandrels 428 may prevent or reduce undesirable changes to the shape of thermoplastic core layer 424 during consolidation. In other words, pressure applied by metallic bladder 430 may not crush or undesirably impact plurality of cavities 427 due to plurality of mandrels 428 within plurality of cavities 427.

As structure 404 is heated and compressed, first thermoplastic layer 422 is consolidated against thermoplastic core layer 424. During heating and compression, resin of first thermoplastic layer 422 flows against thermoplastic core layer 424. As structure 404 is cooled, resin of first thermoplastic layer 422 may solidify against thermoplastic core layer 424. First thermoplastic layer 422 and thermoplastic core layer 424 may create an interface where resin of first thermoplastic layer 422 and resin of thermoplastic core layer 424 may flow together.

As structure 404 is heated and compressed, second thermoplastic layer 426 is consolidated against thermoplastic core layer 424. During heating and compression, resin of second thermoplastic layer 426 flows against thermoplastic core layer 424. As structure 404 is cooled, resin of second thermoplastic layer 426 may solidify against thermoplastic core layer 424. Second thermoplastic layer 426 and thermoplastic core layer 424 may create an interface where resin of second thermoplastic layer 426 and resin of thermoplastic core layer 424 may flow together.

Figure 5:
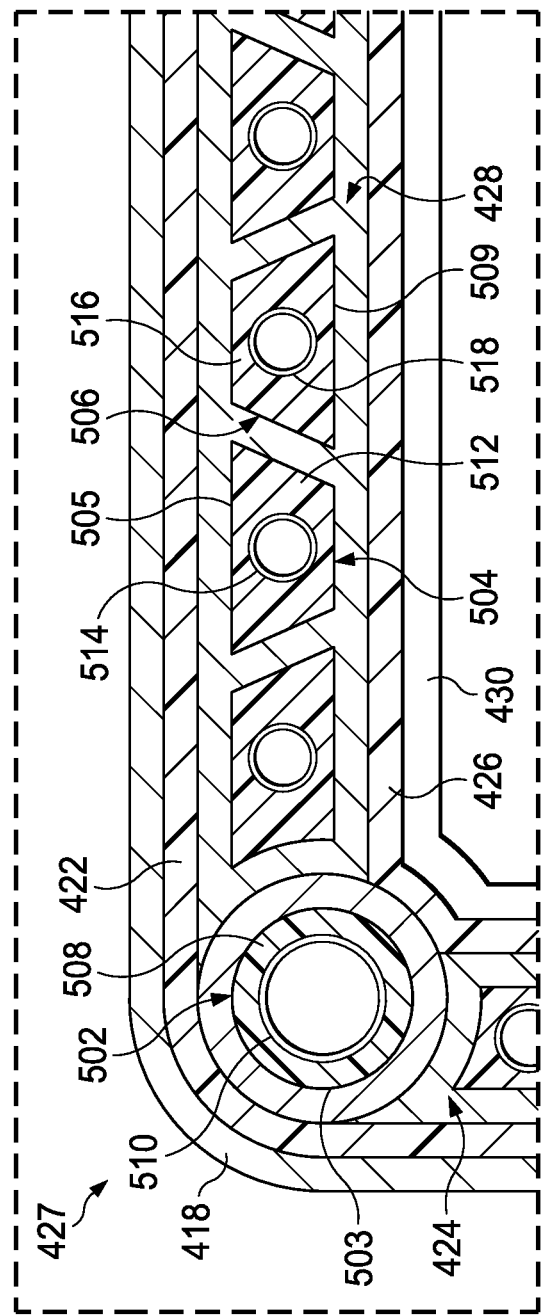
FIG. 5 is an illustration of a cross-sectional view of a structure within a tool in accordance with an illustrative embodiment.

Turning now to FIG. 5, an illustration of a cross-sectional view of a structure within a tool is depicted in accordance with an illustrative embodiment. FIG. 5 is a view of structure 404 within box 5. Structure 404 may be may be a physical implementation of structure 206 in FIG. 2.

As depicted in FIG. 5, plurality of mandrels 428 are located within plurality of cavities 427 of thermoplastic core layer 424. As depicted in FIG. 4 and FIG. 5, plurality of mandrels 428 comprises more than one cross-sectional shape. Mandrel 502, mandrel 504, and mandrel 506 are within plurality of mandrels 428. Mandrel 502 has a circular cross-section. Mandrel 504 and mandrel 506 each have a trapezoidal cross-section. In some illustrative examples, plurality of mandrels 428 may have different or additional cross-sectional shapes.

Mandrel 502, mandrel 504, and mandrel 506 may act as forming tools for thermoplastic core layer 424. During formation of thermoplastic core layer 424, composite material may be laid onto mandrel 502, mandrel 504, and mandrel 506 to form three core parts. After laying composite material, mandrel 502, mandrel 504, and mandrel 506 may be positioned relative to each other to form a portion of thermoplastic core layer 424. In one illustrative example, braided composite material may be laid onto mandrel 502, mandrel 504, and mandrel 506.

Mandrel 502 is configured to provide resistance to pressure from metallic bladder 430 during a consolidation process. As a result, mandrel 502 maintains or substantially maintains the shape of cavity 503 of plurality of cavities 427 during consolidation. Mandrel 502 comprises second material 508 formed into a circular cross-sectional shape and first material 510 formed into a tube.

Second material 508 comprises a soluble material. First material 510 comprises a material configured to generate heat in response to a magnetic field. In some illustrative examples, first material 510 is Invar.

First material 510 may be selected based on at least one of a desired consolidation temperature and the Curie temperature of the number of die liners to be used. As a result, first material 510 may be Invar when the Curie temperature of Invar is desirable taking into account the desired consolidation temperature and the Curie temperature of the number of die liners. Invar may be selected as first material 510 based on other properties of Invar. Specifically, the coefficient of thermal expansion of Invar may be desirable for use in composite material processing. The coefficient of thermal expansion of Invar may be substantially similar to the coefficient of thermal expansion of composite material.

First material 510 may provide reinforcement to second material 508. In some illustrative embodiments, first material 510 may increase rigidity of mandrel 502.

During consolidation of structure 404, first material 510 may generate heat in response to a magnetic field generated by plurality of induction coils 410. In some illustrative examples, first material 510 may generate heat after heating of die liner 418 and die liner 420 proceeds until die liner 418 and die liner 420 are nearly non-magnetic.

Mandrel 504 is configured to provide resistance to pressure from metallic bladder 430 during a consolidation process. As a result, mandrel 504 maintains or substantially maintains the shape of cavity 505 of plurality of cavities 427 during consolidation. Mandrel 504 comprises second material 512 formed into a trapezoidal cross-sectional shape and first material 514 formed into a tube.

Second material 512 comprises a soluble material. First material 514 comprises a material configured to generate heat in response to a magnetic field. In some illustrative examples, first material 514 is Invar. First material 514 may provide reinforcement to second material 512. In some illustrative embodiments, first material 514 may increase rigidity of mandrel 504.

During consolidation of structure 404, first material 514 may generate heat in response to a magnetic field generated by plurality of induction coils 410. In some illustrative examples, first material 514 may generate heat after heating of die liner 418 and die liner 420 proceeds until die liner 418 and die liner 420 are nearly non-magnetic.

Mandrel 506 is configured to provide resistance to pressure from metallic bladder 430 during a consolidation process. As a result, mandrel 506 maintains or substantially maintains the shape of cavity 509 of plurality of cavities 427 during consolidation. Mandrel 506 comprises second material 516 formed into a trapezoidal cross-sectional shape and first material 518 formed into a tube.

Second material 516 comprises a soluble material. First material 518 comprises a material configured to generate heat in response to a magnetic field. In some illustrative examples, first material 518 is Invar. First material 518 may provide reinforcement to second material 516. In some illustrative embodiments, first material 518 may increase rigidity of mandrel 506.

During consolidation of structure 404, first material 518 may generate heat in response to a magnetic field generated by plurality of induction coils 410. In some illustrative examples, first material 518 may generate heat after heating of die liner 418 and die liner 420 proceeds until die liner 418 and die liner 420 are nearly non-magnetic.

Following consolidation, second material 508, second material 512, and second material 516 may be dissolved. First material 510, first material 514, and first material 518 may then be removed from cavity 503, cavity 505, and cavity 509.

Figure 6:
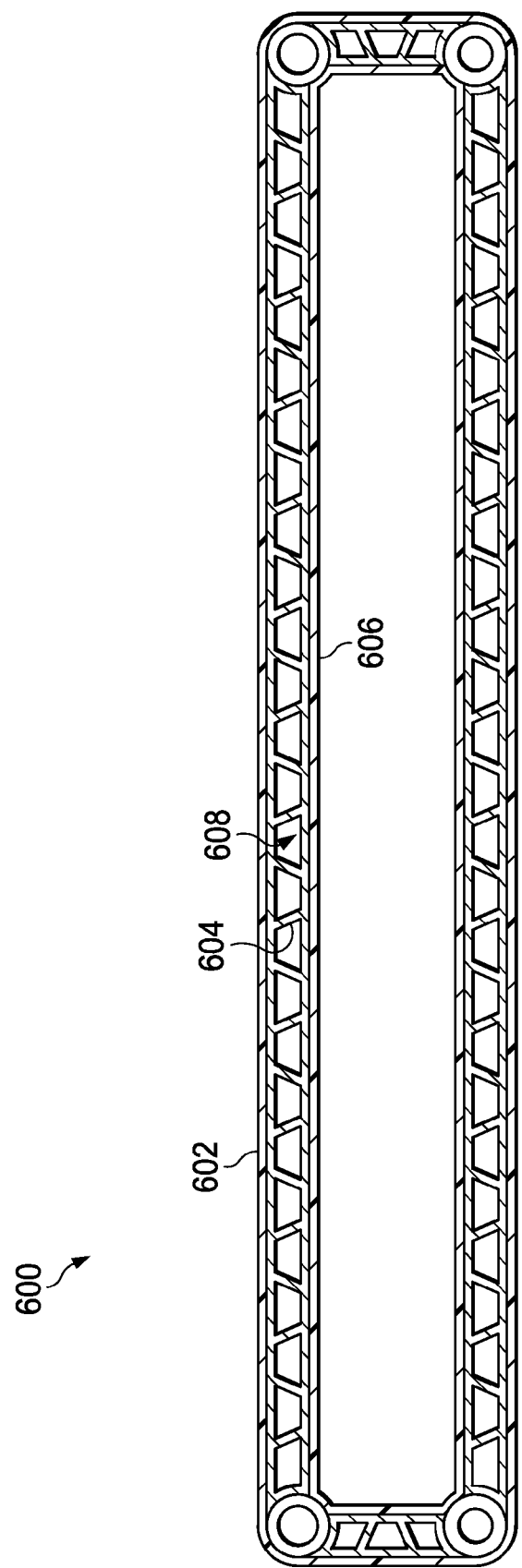
FIG. 6 is an illustration of a structure produced in accordance with an illustrative embodiment.

Turning now to FIG. 6, an illustration of a front view of a structure produced is depicted in accordance with an illustrative embodiment. Structure 600 may be a physical embodiment of structure 206 formed using tool 202 of FIG. 2. Structure 600 may be a physical embodiment of structure 404 from direction 323 of FIG. 3 following consolidation in tool 402 and removal of plurality of mandrels 428 from plurality of cavities 427. Structure 600 may be a skin panel for wing 104 of aircraft 100 of FIG. 1.

Structure 600 is a consolidated thermoplastic sandwich structure. Structure 600 as shown extends into the page. Structure 600 comprises first thermoplastic layer 602, thermoplastic core layer 604, and second thermoplastic layer 606. Thermoplastic core layer 604 has plurality of cavities 608. In some illustrative examples, first thermoplastic layer 602, thermoplastic core layer 604, and second thermoplastic layer 606 may be laid up, and then co-consolidated.

Figure 7:
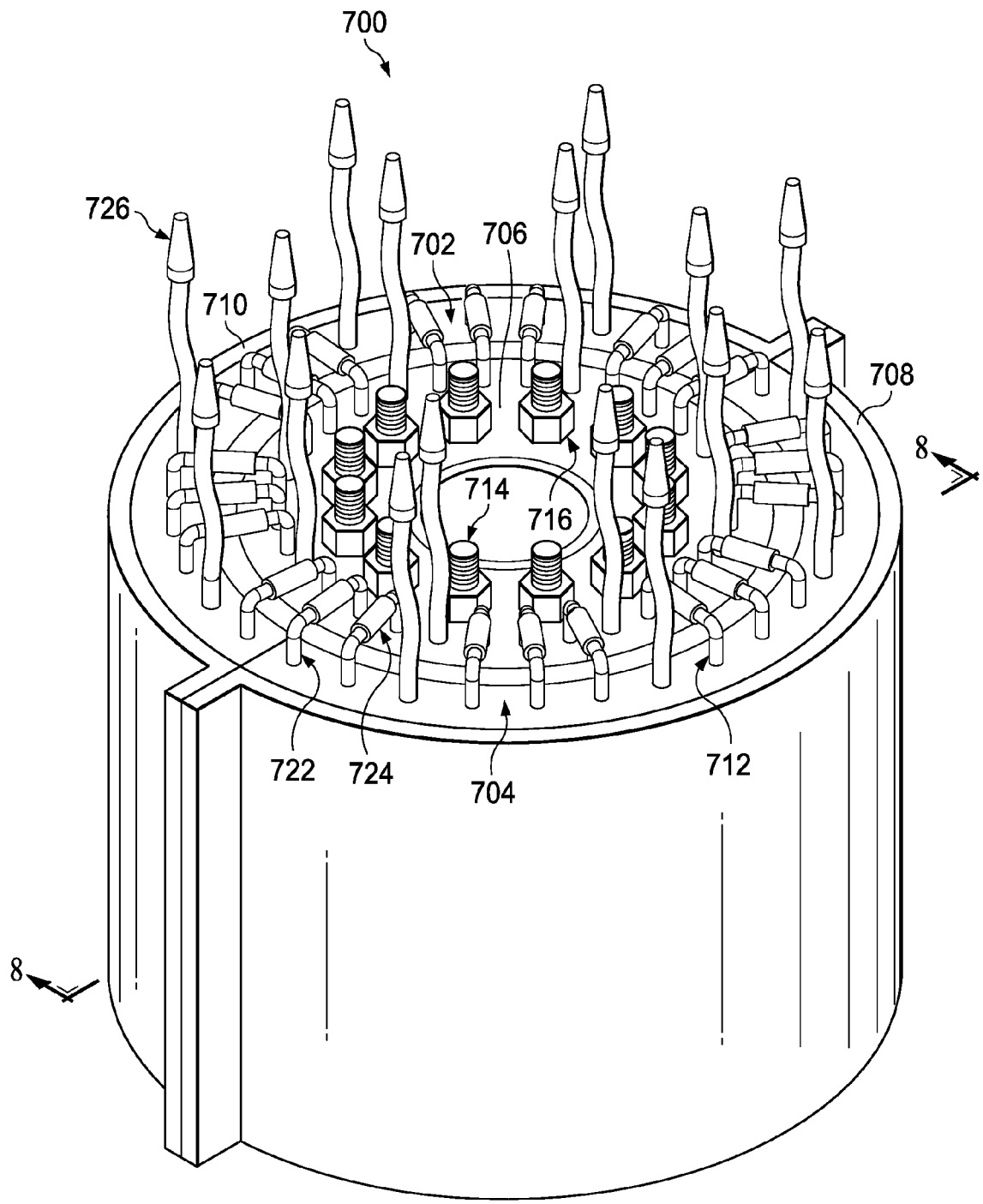
FIG. 7 is an illustration of a perspective view of a tool in accordance with another illustrative embodiment.

Turning now to FIG. 7, an illustration of a perspective view of a tool is depicted in accordance with another illustrative embodiment. In this depicted example, tool 700 is an example of a physical implementation for tool 202 and components in tool 202 in FIG. 2.

In this illustrative example, tool 700 includes first die 702, second die 704, and third die 706. First die 702, second die 704, and third die 706 may be a physical implementation of plurality of dies 218 of FIG. 2. As depicted, third die 706 takes the form of a cylindrical mandrel. In this illustrative example, third die 706 forms an inner mold line. In this illustrative example, first die 702 and second die 704 form an outer mold line. As depicted, first die 702 is mounted within load constraint 708. As depicted, second die 704 is mounted within load constraint 710. First die 702 and second die 704 may be attached to load constraint 708 and load constraint 710 by any suitable fastening device such as bolting or clamping. Load constraint 708 and load constraint 710 may be a physical implementation of plurality of load constraints 217 of FIG. 2.

Load constraint 708 and load constraint 710 provide backing surfaces for first die 702 and second die 704. Load constraint 708 and load constraint 710 may prevent first die 702 and second die 704 from deforming undesirably such as bending and cracking during manufacturing operations. Load constraint 708 and load constraint 710 may be formed from steel, aluminum, or any other desirable material. Material for load constraint 708 and load constraint 710 may be selected based on the loads present during forming or consolidation. In some illustrative examples, the material may be nonmagnetic to reduce any distortion to the magnetic field produced by plurality of induction coils 712. In some illustrative examples, load constraint 708 and load constraint 710 may not be present. In these illustrative examples, first die 702 and second die 704 may be strong enough to prevent bending or cracking.

Third die 706 is reinforced with plurality of rods 714 that are held with plurality of bolts 716. As depicted, plurality of rods 714 extends both longitudinally through third die 706. Plurality of rods 714 may be a physical implementation of plurality of rods 224 of FIG. 2. Plurality of bolts 716 may be a physical implementation of plurality of bolts 227 of FIG. 2.

Plurality of induction coils 712 are associated with first die 702, second die 704, and third die 706. Plurality of induction coils 712 may be a physical implementation of plurality of induction coils 222 of FIG. 2. Plurality of induction coils 712 comprises sections 722 and flexible sections 724. As depicted, sections 722 extend along the length of first die 702, second die 704, and third die 706. Sections 722 may be a physical implementation of sections 223 of FIG. 2. Sections 722 may be embedded in first die 702, second die 704, and third die 706. Flexible sections 724 join sections 722 in first die 702, second die 704, and third die 706. Flexible sections 724 may be a physical implementation of flexible sections 225 of FIG. 2. Connectors 726 located at the ends of plurality of induction coils 712 may connect plurality of induction coils 712 to a controller, power source, coolant supply, or other external utility. Connectors 726 may be a physical implementation of connectors 253 of FIG. 2.

The illustration of tool 700 in FIG. 7 is not meant to imply physical or architectural limitations to the manner in which an illustrative embodiment may be implemented. Other components in addition to or in place of the ones illustrated may be used. Some components may be unnecessary.

For example, plurality of rods 714 may also be present within first die 702 and second die 704. As another example, although first die 702, second die 704, and third die 706 are depicted, tool 700 may instead have more than three dies.

Figure 8:
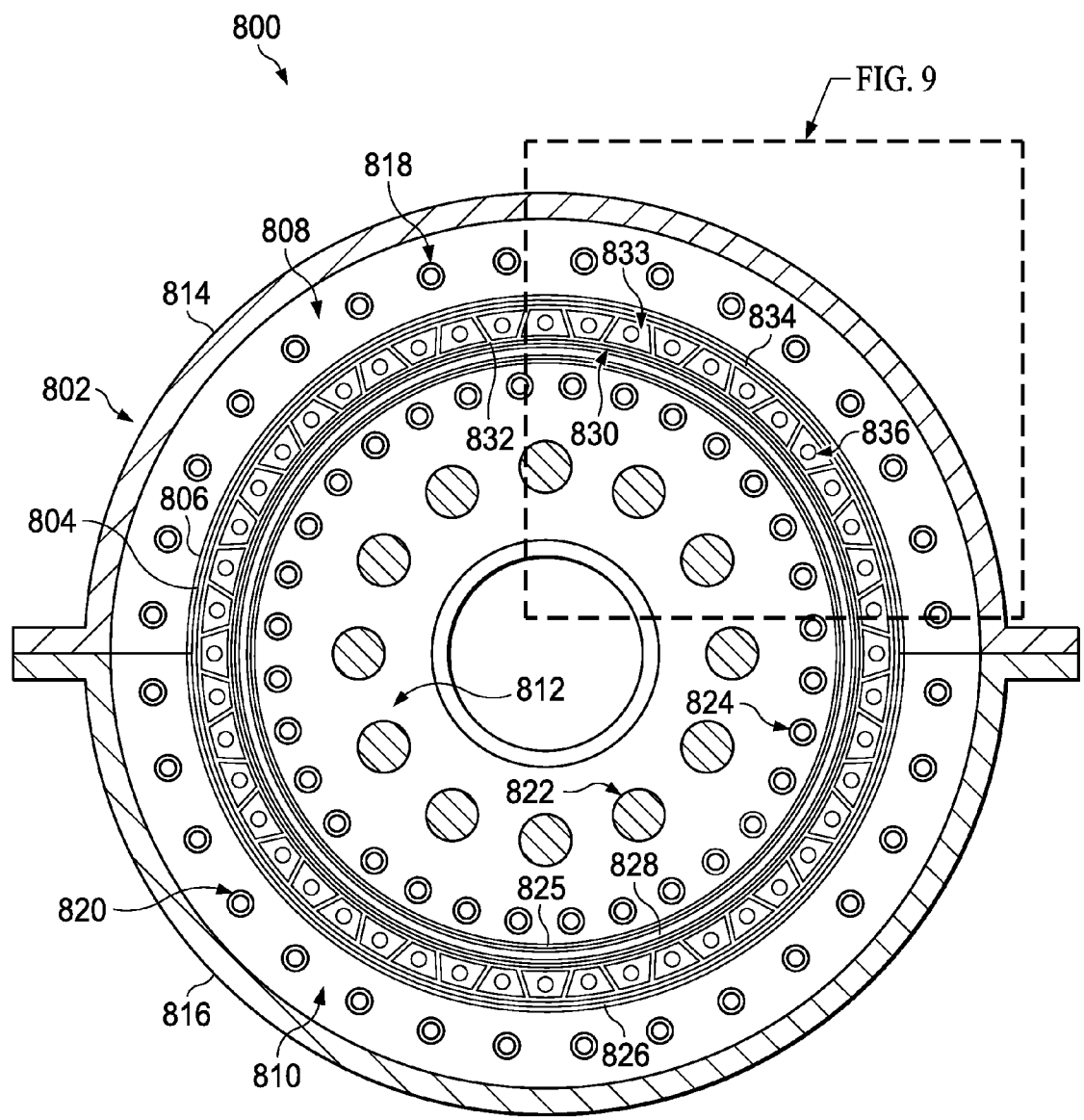
FIG. 8 is an illustration of a cross-sectional view of a structure within a tool in accordance with an illustrative embodiment.

Turning now to FIG. 8, an illustration of a cross-sectional view of a structure within a tool is depicted in accordance with an illustrative embodiment. View 800 may be a cross-sectional view of a structure within tool 700 of FIG. 7 along 8-8. Tool 802 may be a physical implementation of tool 202 in FIG. 2. Structure 804 may be a physical implementation of structure 206 in FIG. 2.

As depicted, structure 804 is positioned within tool 802. Specifically, structure 804 is positioned between first die 808, second die 810, and third die 812 within die cavity 806 of tool 802. Plurality of induction coils 818 runs through first die 808. Plurality of induction coils 820 runs through second die 810. Plurality of induction coils 824 runs through third die 812. Plurality of induction coils 818, plurality of induction coils 820, and plurality of induction coils 824 are joined by flexible sections.

Plurality of rods 822 runs through third die 812. First die 808 and second die 810 are held within load constraint 814 and load constraint 816.

Die liner 825 is associated with third die 812 within die cavity 806. Die liner 825 contacts metallic bladder 828. Die liner 826 is associated with first die 808 and second die 810 in die cavity 806. Die liner 826 contacts structure 804 within die cavity 806.

Structure 804 comprises first thermoplastic layer 834, thermoplastic core layer 832, and second thermoplastic layer 830. First thermoplastic layer 834 may be a physical implementation of first thermoplastic layer 236 of FIG. 2. Thermoplastic core layer 832 may be a physical implementation of thermoplastic core layer 238 of FIG. 2. Second thermoplastic layer 830 may be a physical implementation of second thermoplastic layer 240 of FIG. 2.

Second thermoplastic layer 830 may be formed of a number of layers of composite tape, composite tows, a braided composite, or any other suitable composite material. Second thermoplastic layer 830 may be formed using a composite layup process. The composite layup process may be selected from one of braiding, tape layup, tow layup, or any other desirable composite layup process. In some illustrative examples, second thermoplastic layer 830 may be placed on metallic bladder 828 through a composite layup process. In one illustrative example, the composite layup process may lay composite material directly onto metallic bladder 828. In one illustrative example, composite material may be braided onto metallic bladder 828 to form second thermoplastic layer 830.

In some illustrative examples, second thermoplastic layer 830 may be placed on metallic bladder 828 as a preform. In this illustrative example, second thermoplastic layer 830 may be formed to a desired shape prior to being placed on metallic bladder 828. In some illustrative examples, second thermoplastic layer 830 may be consolidated or semi rigid as second thermoplastic layer 830 is placed on metallic bladder 828.

Thermoplastic core layer 832 has plurality of cavities 833. Plurality of cavities 833 extend into structure 804 and into the page in FIG. 8. Plurality of cavities 833 contains plurality of mandrels 836. Thermoplastic core layer 832 may be formed using a composite layup process. The composite layup process may be selected from one of braiding, tape layup, tow layup, or other desirable composite layup process. In some illustrative examples, thermoplastic core layer 832 may be formed by laying composite material onto plurality of mandrels 836. In one illustrative example, thermoplastic core layer 832 may be formed by laying down a braided thermoplastic material over plurality of mandrels 836. After laying composite material onto plurality of mandrels 836, plurality of mandrels 836 may be positioned relative to each other to form thermoplastic core layer 832. In some illustrative examples, after laying composite material onto plurality of mandrels 836, plurality of mandrels 836 may be positioned relative to each other on second thermoplastic layer 830 to form thermoplastic core layer 832.

First thermoplastic layer 834 may be formed of a number of layers of composite tape, composite tows, a braided composite or any other suitable composite material. First thermoplastic layer 834 may be formed using a composite layup process. The composite layup process may be selected from one of braiding, tape layup, tow layup, or any other desirable composite layup process. In some illustrative examples, first thermoplastic layer 834 may be placed on thermoplastic core layer 832 through a composite layup process. In one illustrative example, the composite layup process may lay composite material directly onto thermoplastic core layer 832. In one illustrative example, composite material may be braided onto thermoplastic core layer 832 to form first thermoplastic layer 834.

In some illustrative examples, first thermoplastic layer 834 may be placed on thermoplastic core layer 832 as a preform. In this illustrative example, first thermoplastic layer 834 may be formed to a desired shape prior to being placed on thermoplastic core layer 832. In some illustrative examples, first thermoplastic layer 834 may be consolidated or semi rigid as first thermoplastic layer 834 is placed on thermoplastic core layer 832.

To consolidate structure 804, power may be supplied to plurality of induction coils 818, plurality of induction coils 820, and plurality of induction coils 824 to produce a magnetic field. In response to the magnetic field, die liner 825 and die liner 826 may generate heat.

Metallic bladder 828 may be pressurized. In some illustrative examples, metallic bladder 828 may be pressurized using an inert gas. When pressurized, metallic bladder 828 may impart a compressive force to structure 804. Metallic bladder 828 may impart a compressive force to structure 804 by expanding under pressure to press structure 404 against die liner 825 and die liner 826. Die liner 825 and die liner 826 are associated with first die 808 and second die 810. First die 808 and second die 810 define an outer mold line for structure 804. When metallic bladder 828 is pressurized, first die 808 and second die 810 provide resistant pressure. In other words, first die 808 and second die 810 may provide a substantially rigid outer mold line for structure 804. Effectively metallic bladder 430 expands and presses structure 404 against first die 406 and second die 408.

When structure 804 is a braided thermoplastic material, slits of braided thermoplastic material may move relative to each other. This movement of braided thermoplastic material may occur when metallic bladder 828 expands under pressure. Movement of braided thermoplastic material may improve the quality of resulting structure 804.

Plurality of mandrels 836 may prevent or reduce undesirable changes to the shape of thermoplastic core layer 832 during consolidation. In other words, pressure applied by metallic bladder 828 may not crush or undesirably impact plurality of cavities 833 due to plurality of mandrels 836 within plurality of cavities 833.

As structure 804 is heated and compressed, first thermoplastic layer 834 is consolidated against thermoplastic core layer 832. During heating and compression, resin of first thermoplastic layer 834 flows against thermoplastic core layer 832. As structure 804 is cooled, first thermoplastic layer 834 may solidify against thermoplastic core layer 832. First thermoplastic layer 834 and thermoplastic core layer 832 may create an interface where resin of first thermoplastic layer 834 and resin of thermoplastic core layer 832 may flow together.

As structure 804 is heated and compressed, second thermoplastic layer 830 is consolidated against thermoplastic core layer 832. During heating and compression, resin of second thermoplastic layer 830 flows against thermoplastic core layer 832. As structure 804 is cooled, second thermoplastic layer 830 may solidify against thermoplastic core layer 832. Second thermoplastic layer 830 and thermoplastic core layer 832 may create an interface where resin of second thermoplastic layer 830 and resin of thermoplastic core layer 832 may flow together.

Figure 9:
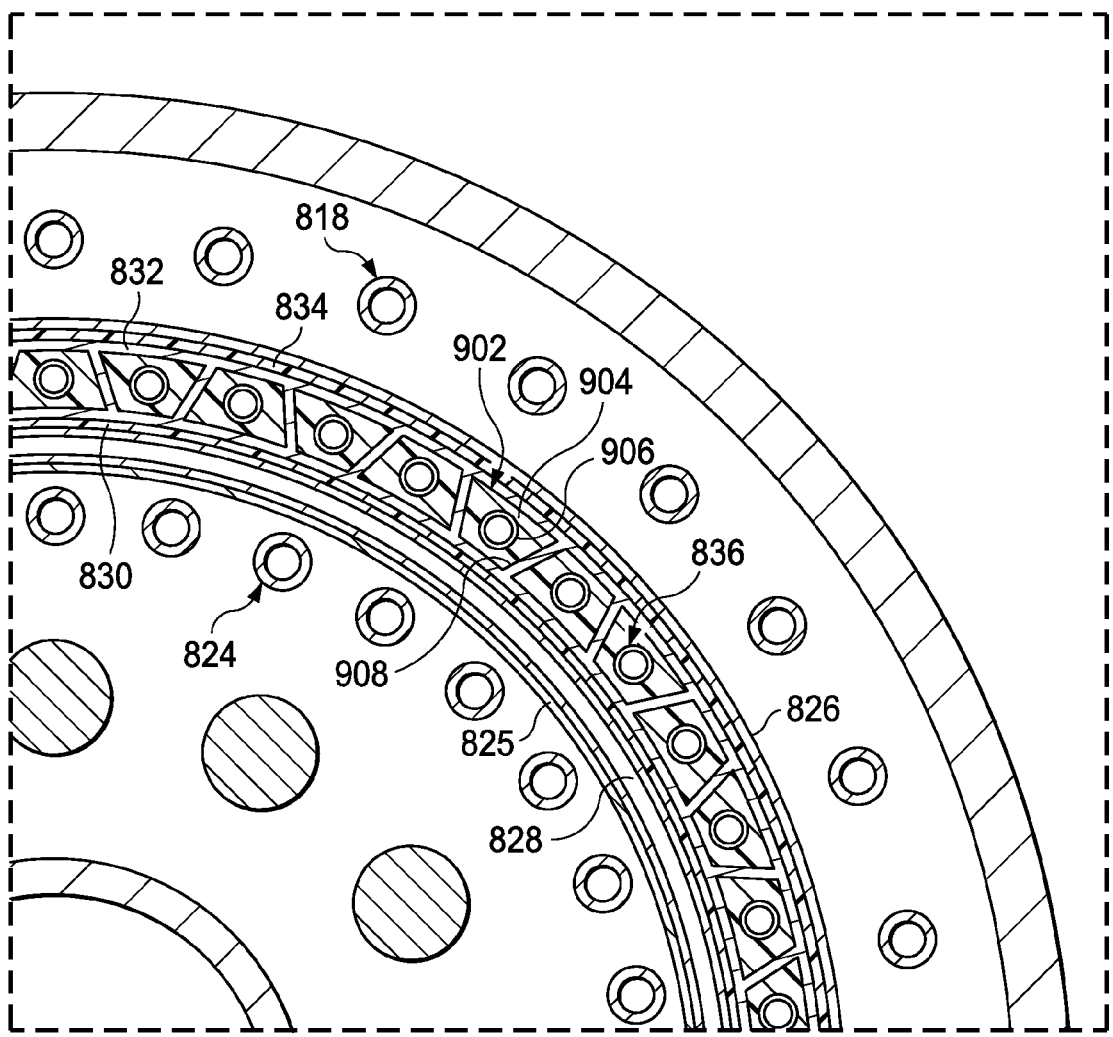
FIG. 9 is an illustration of a cross-sectional view of a structure within a tool in accordance with an illustrative embodiment.

Turning now to FIG. 9, an illustration of a cross-sectional view of a structure within a tool is depicted in accordance with an illustrative embodiment. FIG. 9 is a view within box 9 of FIG. 8. As depicted in FIG. 9, plurality of mandrels 836 are located within plurality of cavities 833 of thermoplastic core layer 832. As depicted in FIG. 8 and FIG. 9, plurality of mandrels 836 comprises one cross-sectional shape.

Mandrel 902 is within plurality of mandrels 836. Mandrel 902 has a trapezoidal cross-section. In some illustrative examples, plurality of mandrels 836 may have different or additional cross-sectional shapes.

Mandrel 902 may act as a forming tool for thermoplastic core layer 832. During formation of thermoplastic core layer 832, composite material may be laid onto mandrel 902. After laying composite material, mandrel 902 may be positioned relative to other mandrels in plurality of mandrels 836 to form a portion of thermoplastic core layer 832. In one illustrative example, braided composite material may be laid onto mandrel 902.

Mandrel 902 is configured to provide resistance to pressure from metallic bladder 828 during a consolidation process. As a result, mandrel 902 maintains or substantially maintains the shape of cavity 908 of plurality of cavities 833 during consolidation. Mandrel 902 comprises second material 904 formed into a trapezoidal cross-sectional shape and first material 906 formed into a tube.

Second material 904 comprises a soluble material. First material 906 comprises a material configured to generate heat in response to a magnetic field. In some illustrative examples, first material 906 is Invar. First material 906 may provide reinforcement to second material 904. In some illustrative embodiments, first material 906 may increase rigidity of mandrel 902.

During consolidation of structure 804, first material 906 may generate heat in response to a magnetic field generated by plurality of induction coils 818, plurality of induction coils 820, and plurality of induction coils 824. In some illustrative examples, first material 906 may generate heat after heating of die liner 825 and die liner 826 proceeds until die liner 825 and die liner 826 are nearly non-magnetic.

Figure 10:
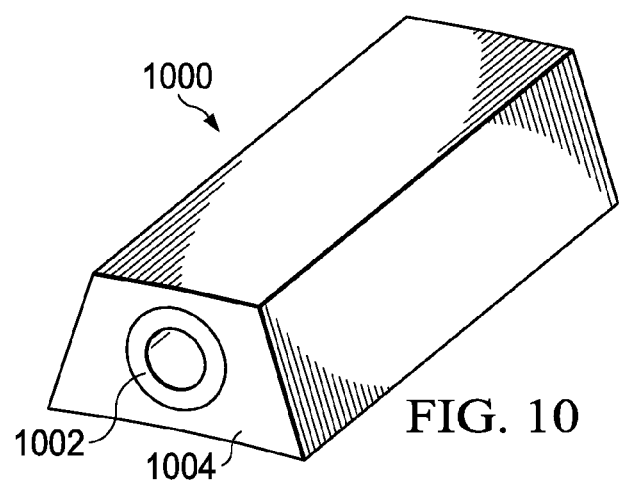
FIG. 10 is an illustration of a perspective view of a mandrel in accordance with an illustrative embodiment.

Turning now to FIG. 10, an illustration of a perspective view of a mandrel is depicted in accordance with an illustrative embodiment. In this depicted example, mandrel 1000 is an example of a physical implementation of a mandrel of plurality of mandrels 248 of FIG. 2. Mandrel 1000 may be mandrel 902 of FIG. 9. Mandrel 1000 may be used to manufacture an aircraft part such as a skin panel of wing 104 of aircraft 100 of FIG. 1.

As depicted, mandrel 1000 has a trapezoidal cross-section. In some illustrative examples, mandrel 1000 may have different or varying cross-sectional shapes. In one illustrative example, mandrel 1000 may have a circular cross-sectional shape. In another illustrative example, mandrel 1000 may have a triangular cross-sectional shape.

Mandrel 1000 comprises second material 1002 formed into a trapezoidal cross-sectional shape and first material 1004 formed into a tube. Second material 1002 comprises a soluble material. First material 1004 comprises a material configured to generate heat in response to a magnetic field. In some illustrative examples, first material 1004 is Invar. First material 1004 may provide reinforcement to second material 1002. In some illustrative embodiments, first material 1004 may increase rigidity of mandrel 1000.

Mandrel 1000 may act as a forming tool for a thermoplastic core layer, such as thermoplastic core layer 238 in FIG. 2. During formation of a thermoplastic core layer, composite material may be laid onto mandrel 1000 to form a core part. This core part may be a core part in plurality of core parts 237 in FIG. 2. After laying composite material, mandrel 1000 may be positioned relative to other mandrels to form a portion of a thermoplastic core layer. In one illustrative example, braided composite material may be laid onto mandrel 1000.

Mandrel 1000 may define a cavity in a thermoplastic core layer. This cavity may be a cavity in plurality of cavities 244 in FIG. 2.

Mandrel 1000 is configured to provide resistance to pressure from a metallic bladder such as metallic bladder 208 of FIG. 2 during a consolidation process. As a result, mandrel 1000 maintains or substantially maintains the shape of the cavity during consolidation.

During consolidation, first material 1004 may generate heat in response to a magnetic field generated by a plurality of induction coils, such as plurality of induction coils 222 of FIG. 2. In some illustrative examples, first material 1004 may generate heat after heating of a die liner proceeds until the die liner is nearly non-magnetic. This die liner may be a die liner in die liners 226 of FIG. 2.

The different components shown in FIGS. 3-10 may be combined with components in FIG. 2, used with components in FIG. 2, or a combination of the two. Additionally, some of the components in FIGS. 3-10 may be illustrative examples of how components shown in block form in FIG. 2 can be implemented as physical structures.

Figure 11:
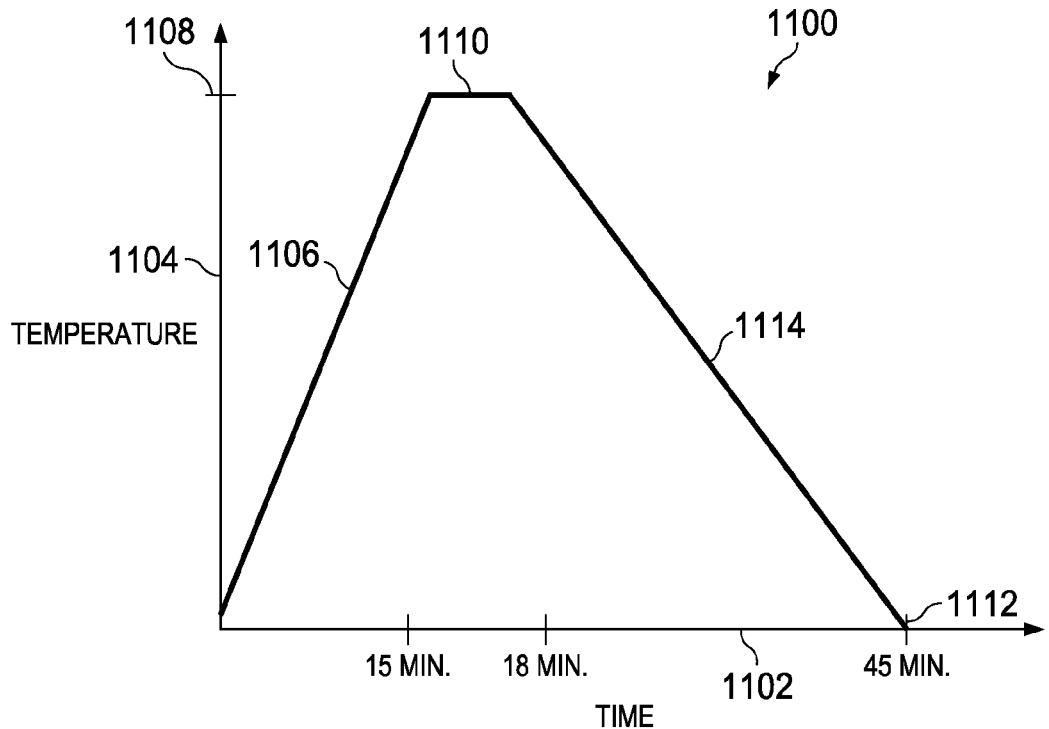
FIG. 11 is an illustration of a temperature cycle in accordance with an illustrative embodiment.

Turning now to FIG. 11, an illustration of a temperature cycle is depicted in accordance with an illustrative embodiment. Temperature cycle 1100 may be an illustrative example of a temperature cycle for tool 202 in structure 206 in FIG. 2.

Temperature cycle 1100 has x axis 1102 and y axis 1104. Temperature cycle 1100 represents the consolidation of a structure comprising a thermoplastic material in a tool. The tool comprises an inductive heating tool.

X axis 1102 represents time in minutes. Y axis 1104 represents temperature. In temperature cycle 1100, the tool takes approximately 15 minutes, as represented by ramp 1106, to heat the structure to consolidating temperature 1108. Afterwards, consolidating temperature 1108 is held for approximately 3 minutes, as represented by hold 1110. Following hold 1110, the structure is controllably cooled to room temperature 1112, as represented by ramp 1114.

In some illustrative examples, the structure is cooled in ramp 1114 at a rate to produce desirable material characteristics. For example, the structure may be cooled at a rate to produce a desired degree of crystallinity in the thermoplastic material of the structure. In some illustrative examples, the structure is cooled in ramp 1114 at a rate to prevent undesirable material characteristics.

As depicted, temperature cycle 1100 for consolidation of the structure in the tool is significantly shorter than curing a thermoset material. Further, as depicted, temperature cycle 1100 for consolidation of the structure in the tool may take less time than consolidation using a resistive heating tool. Accordingly, by using temperature cycle 1100, manufacturing time of sandwich structures may be reduced. Further, by using temperature cycle 1100, manufacturing costs may be reduced.

Figure 12:
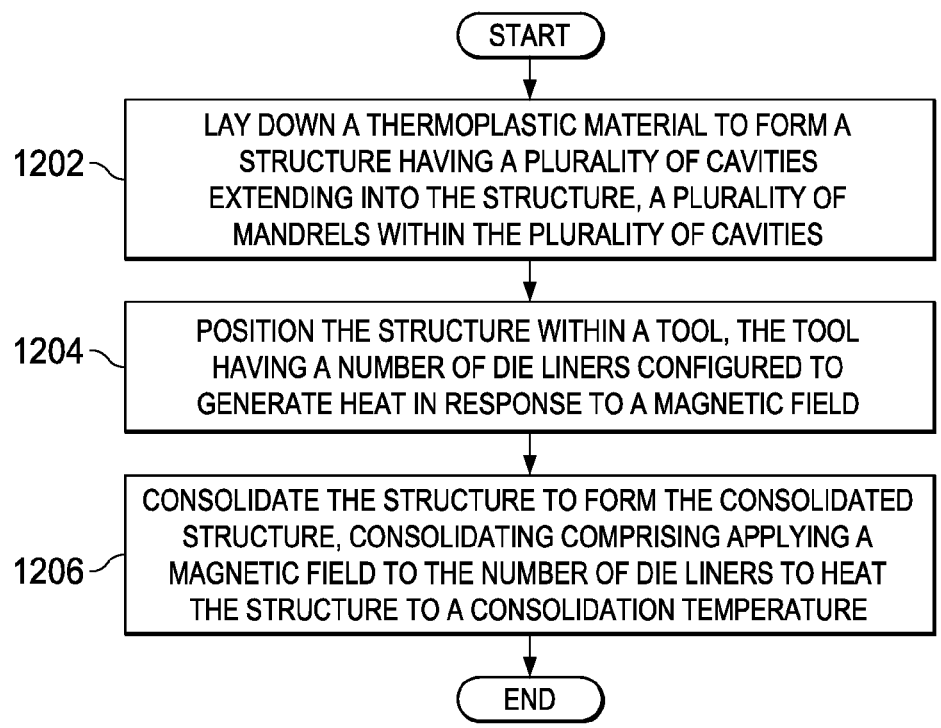
FIG. 12 is an illustration of a flowchart of a process for forming a sandwich structure in accordance with an illustrative embodiment.

Turning now to FIG. 12, an illustration of a flowchart of a process for forming a sandwich structure is depicted in accordance with an illustrative embodiment. The process illustrated in FIG. 12 may be implemented in manufacturing environment 200 of FIG. 2. Further, this process may be implemented to form structure 206 of FIG. 2.

The process may begin by laying down a thermoplastic material to form a structure having a plurality of cavities extending into the structure, a plurality of mandrels within the plurality of cavities (operation 1202). The structure may be structure 206 of FIG. 2. The process may then position the structure within a tool, the tool having a number of die liners configured to generate heat in response to a magnetic field (operation 1204). The number of die liners may be die liners 226 of FIG. 2. The process may then consolidate the structure to form the consolidated structure, consolidating comprising applying a magnetic field to the number of die liners to heat the structure to a consolidation temperature (operation 1206). Afterwards, the process terminates.

Figure 13:
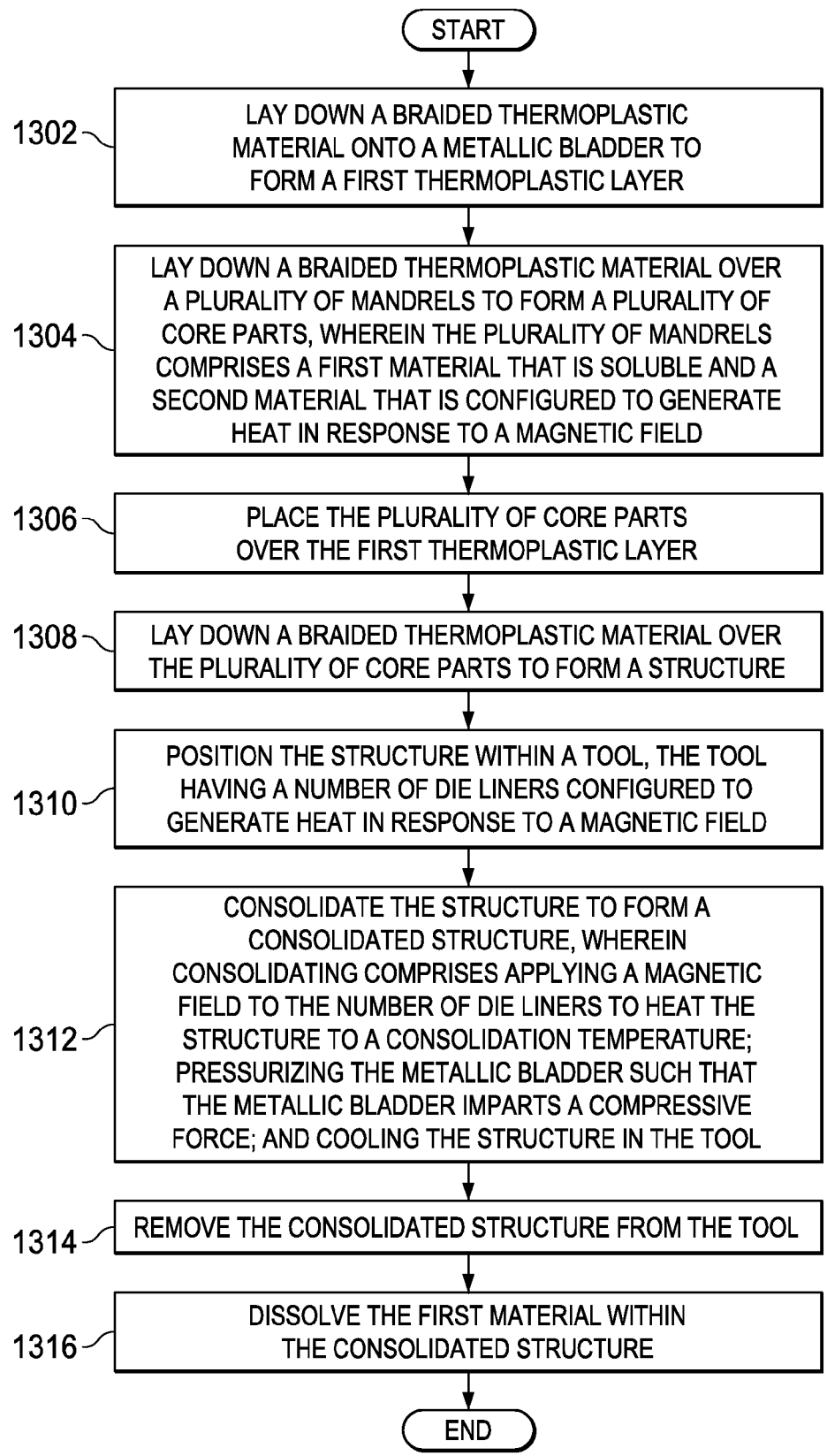
FIG. 13 is an illustration of a flowchart of a process for forming a sandwich structure in accordance with an illustrative embodiment.

Turning now to FIG. 13, an illustration of a flowchart of a process for forming a sandwich structure is depicted in accordance with an illustrative embodiment. The process illustrated in FIG. 13 may be implemented in manufacturing environment 200 of FIG. 2. Further, this process may be implemented to form structure 206 of FIG. 2. The process may begin by laying down a braided thermoplastic material onto a metallic bladder to form a first thermoplastic layer (operation 1302). The metallic bladder may be metallic bladder 208 of FIG. 2. The first thermoplastic layer may be second thermoplastic layer 240 of FIG. 2.

The process may then lay down a braided thermoplastic material over a plurality of mandrels to form a plurality of core parts, wherein the plurality of mandrels comprises a second material that is soluble and a first material that is configured to generate heat in response to a magnetic field (operation 1304). The plurality of mandrels may be plurality of mandrels 248 of FIG. 2.

The process may then place the plurality of core parts over the first thermoplastic layer (operation 1306). The plurality of core parts may be plurality of core parts 237 of FIG. 2.

Next, the process may lay down a braided thermoplastic material over the plurality of core parts to form a structure (operation 1308). Laying down the braided thermoplastic material may form first thermoplastic layer 236 of FIG. 2.

Next, the process may position the structure within a tool, the tool having a number of die liners configured to generate heat in response to a magnetic field (operation 1310). The tool may be tool 202 having die liners 226 of FIG. 2.

The process may then consolidate the structure to form a consolidated structure, wherein consolidating comprises applying a magnetic field to the number of die liners to heat the structure to a consolidation temperature; pressurizing the metallic bladder such that the metallic bladder imparts a compressive force; and cooling the structure in the tool (operation 1312). The metallic bladder may be metallic bladder 208 of FIG. 2. When the structure has a braided thermoplastic material, slits of braided thermoplastic material may move relative to each other. This movement of braided thermoplastic material may occur when metallic bladder 208 expands under pressure. Movement of braided thermoplastic material may improve the quality of resulting structure 206.

The process may then remove the consolidated structure from the tool (operation 1314). Next, the process may dissolve the second material within the consolidated structure (operation 1316). Afterwards, the process terminates.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a block diagram in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. One or more illustrative embodiments may be used during component and subassembly manufacturing 1406. For example, structure 206 in FIG. 2 may be formed using tool 202 during component and subassembly manufacturing 1406. Further, structure 206 may also be used to perform replacements during maintenance and service 1414. For example, aircraft 1500 may be inspected during scheduled maintenance for aircraft 1500. Structure 206 may be part of aircraft 1500 such as part of airframe 1502 or systems 1504.

The illustrative embodiments provide a method and apparatus for forming a thermoplastic sandwich structure. Specifically, the illustrative embodiments provide a method and apparatus for forming a thermoplastic sandwich structure without the use of fasteners. A structure may comprise first thermoplastic layer 236, thermoplastic core layer 238, and second thermoplastic layer 240. By using plurality of induction coils 222 and die liners 226 of tool 202, structure 206 may be consolidated. During consolidation, first material 252 in plurality of mandrels 248 may heat in response to a magnetic field generated by plurality of induction coils 222.

Metallic bladder 208 may provide a compressive force during consolidation. Plurality of mandrels 248 provide support to plurality of cavities 244 within thermoplastic core layer 238 during consolidation.

In some illustrative examples, first thermoplastic layer 236 may comprise a braided composite. In some illustrative examples, second thermoplastic layer 240 may comprise a braided composite. In some illustrative examples, thermoplastic core layer 238 may comprise braided composites surrounding plurality of mandrels 248.

By forming thermoplastic sandwich structures according to the illustrative embodiments, manufacturing time may be decreased. By forming thermoplastic sandwich structures according to illustrative embodiments, manufacturing costs for the sandwich structures may be decreased. Further, the illustrative embodiments may create thermoplastic sandwich structures with lower weights than sandwich structures including fasteners.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a composite structure comprising:
a first layer of thermoplastic material;
a second layer of thermoplastic material; and
a core layer of thermoplastic material located between the first and second layer and comprising a plurality of cavities extending into the composite structure;
a metallic bladder located within the composite structure and configured to be pressurized to impart a compressive force on the composite structure; and
a plurality of mandrels located within the plurality of cavities, wherein the plurality of mandrels comprises a first material that is soluble and a second material that is configured to generate heat in response to a magnetic field.

2. The apparatus of claim 1, wherein the composite structure is a sandwich structure and the plurality of mandrels are internal to the sandwich structure.

3. The apparatus of claim 2, further comprising:
a tool, the tool comprising:
a plurality of dies creating a die cavity;
a number of die liners within the die cavity; and
a plurality of induction coils, sections of the plurality of induction coils embedded in the plurality of dies.

4. The apparatus of claim 1, wherein the plurality of mandrels are within the thermoplastic core layer.

5. The apparatus of claim 4, wherein the second material comprises a plurality of metallic tubes.

6. The apparatus of claim 1, wherein the plurality of cavities extending into the composite structure are in communication with a plurality of openings in a surface of the composite structure.

7. The apparatus of claim 1, wherein the second material comprises:
a plurality of tubes within the first material.

8. The apparatus of claim 1, wherein the first and second thermoplastic layer are consolidated against the thermoplastic core layer.

9. An apparatus comprising:
a composite structure comprising a thermoplastic material that is consolidated, the thermoplastic material comprising:
a thermoplastic core layer comprising a plurality of cavities extending into the composite structure;
a first thermoplastic layer on a first side of the thermoplastic core layer, the first side of the thermoplastic core layer comprising an exterior surface of the thermoplastic core layer;
a second thermoplastic layer on a second side of the thermoplastic core layer, the second side of the thermoplastic core layer comprising an interior surface of the thermoplastic core layer;
a metallic bladder located within the composite structure, wherein the metallic bladder is configured to be pressurized to impart a compressive force on the composite structure;
a plurality of mandrels located within the plurality of cavities, wherein the plurality of mandrels comprises a first material that is soluble and a second material that is configured to generate heat in response to a magnetic field, the second material formed into a plurality of metallic tubes within the first material; and
a tool, the tool comprising:
a plurality of dies creating a die cavity;
a number of die liners within the die cavity; and
a plurality of induction coils, sections of the plurality of induction coils embedded in the plurality of dies.

10. An apparatus comprising:
a composite structure comprising:
a first layer of thermoplastic material;
a second layer of thermoplastic material; and
a core layer of thermoplastic material located between the first and second layer and comprising a plurality of cavities extending into the composite structure;
a metallic bladder located within the composite structure and configured to be pressurized to impart a compressive force on the composite structure;
a plurality of mandrels located within the plurality of cavities, wherein the plurality of mandrels comprises a first material that is soluble and a second material that is configured to generate heat in response to a magnetic field; and
a tool, the tool comprising:
a plurality of dies creating a die cavity;
a number of die liners within the die cavity; and
a plurality of induction coils, sections of the plurality of induction coils embedded in the plurality of dies.

11. A method of forming a consolidated structure comprising:
laying down a thermoplastic material to form a preform structure having a first layer of thermoplastic material, a second layer of thermoplastic material, and a core layer of thermoplastic material located between the first and second layer and comprising a plurality of cavities extending into the preform structure;
positioning a plurality of mandrels within the plurality of cavities, wherein the plurality of mandrels comprises a first material that is soluble and a second material that is configured to generate heat in response to a magnetic field;
positioning a metallic bladder within the preform structure, wherein the metallic bladder is configured to be pressurized to impart a compressive force on the preform structure; and
positioning the preform structure within a tool, the tool having a number of die liners configured to generate heat in response to a magnetic field.

12. The method of claim 11, wherein laying down the thermoplastic material to form the preform structure having the plurality of cavities extending into the preform structure comprises:
laying down a braided thermoplastic material over the plurality of mandrels to form a plurality of core parts.

13. The method of claim 12 further comprising:
consolidating the preform structure to form the consolidated structure, consolidating comprising applying a magnetic field to the number of die liners to heat the preform structure to a consolidation temperature and wherein laying down the thermoplastic material to form the preform structure having the plurality of cavities further comprises laying down a braided thermoplastic material onto the metallic bladder to form the first layer of thermoplastic material, and placing the plurality of core parts over the first layer of thermoplastic material, and wherein consolidating the preform structure to form the consolidated structure further comprises pressurizing the metallic bladder such that the metallic bladder expands and imparts a compressive force, pressing the preform structure against the number of die liners.

14. The method of claim 13, wherein laying down the thermoplastic material to form the preform structure having the plurality of cavities further comprises laying down a braided thermoplastic material over the plurality of core parts.

15. The method of claim 12 further comprising:
consolidating the preform structure to form the consolidated structure, consolidating comprising applying a magnetic field to the number of die liners to heat the preform structure to a consolidation temperature and wherein consolidating the preform structure to form the consolidated structure further comprises applying the magnetic field to the plurality of mandrels, wherein the second material is Invar.

16. The method of claim 11 further comprising:
dissolving a material from within the consolidated structure.

17. The method of claim 11, wherein the number of die liners comprises a number of smart susceptors.

18. The method of claim 11 further comprising:
consolidating the structure to form the consolidated structure, consolidating comprising applying a magnetic field to the number of die liners to heat the structure to a consolidation temperature.

19. A method of forming a consolidated structure comprising:
laying down a braided thermoplastic material onto a metallic bladder to form a first thermoplastic layer;
laying down a braided thermoplastic material over a plurality of mandrels to form a plurality of core parts, wherein the plurality of mandrels comprises a first material that is configured to generate heat in response to a magnetic field and a second material that is soluble;

placing the plurality of core parts over the first thermoplastic layer;

laying down a braided thermoplastic material over the plurality of core parts to form a preform structure, wherein the metallic bladder is located within the preform structure;

positioning the preform structure within a tool, the tool having a number of die liners configured to generate heat in response to a magnetic field;

consolidating the preform structure to form the consolidated structure, wherein consolidating comprises:

applying a magnetic field to the number of die liners to heat the preform structure to a consolidation temperature;

pressurizing the metallic bladder such that the metallic bladder expands and imparts a compressive force, pressing the preform structure against the number of die liners; and cooling the preform structure in the tool;

removing the consolidated structure from the tool; and dissolving the second material within the consolidated structure.

20. The method of claim 19 further comprising:

applying the magnetic field to the plurality of mandrels, wherein the first material is Invar.

21. The method of claim 19, wherein the number of die liners comprises a number of smart susceptors.

\* \* \* \* \*